US011946492B2

(12) United States Patent
Hoshino et al.

(10) Patent No.: US 11,946,492 B2
(45) Date of Patent: Apr. 2, 2024

(54) WORK MACHINE

(71) Applicant: Hitachi Construction Machinery Co., Ltd., Tokyo (JP)

(72) Inventors: Masatoshi Hoshino, Tsuchiura (JP); Seiji Hijikata, Tsukuba (JP); Yasutaka Tsuruga, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 50 days.

(21) Appl. No.: 17/910,521

(22) PCT Filed: Jul. 13, 2021

(86) PCT No.: PCT/JP2021/026349
§ 371 (c)(1),
(2) Date: Sep. 9, 2022

(87) PCT Pub. No.: WO2022/014606
PCT Pub. Date: Jan. 20, 2022

(65) Prior Publication Data

US 2023/0184265 A1 Jun. 15, 2023

(30) Foreign Application Priority Data

Jul. 15, 2020 (JP) ................................ 2020-121650

(51) Int. Cl.
*F15B 11/042* (2006.01)
*E02F 9/20* (2006.01)
(Continued)

(52) U.S. Cl.
CPC ........ *F15B 11/0423* (2013.01); *E02F 9/2004* (2013.01); *E02F 9/2228* (2013.01);
(Continued)

(58) Field of Classification Search
CPC .......................... F15B 2211/45; F15B 21/087; F15B 11/0423; E02F 9/2282
See application file for complete search history.

(56) References Cited

U.S. PATENT DOCUMENTS

2015/0252819 A1 9/2015 Imura et al.

FOREIGN PATENT DOCUMENTS

JP 7-13605 A 1/1995
JP 9-247515 A 9/1997
(Continued)

OTHER PUBLICATIONS

International Search Report (PCT/ISA/210) issued in PCT Application No. PCT/JP2021/026349 dated Sep. 21, 2021 with English translation (six (6) pages).
(Continued)

*Primary Examiner* — Abiy Teka
(74) *Attorney, Agent, or Firm* — Crowell & Moring LLP

(57) ABSTRACT

A work machine includes: a hydraulic actuator that is driven by a hydraulic fluid from a hydraulic pump; an open-center directional control valve that is arranged on a center bypass line, and controls a flow of the hydraulic fluid to be supplied to the hydraulic actuator; a CB cut valve arranged between a directional control valve and a hydraulic working fluid tank on the center bypass line; and a machine controller that controls an opening of the CB cut valve. The machine controller restricts the opening of the CB cut valve when operation on the hydraulic actuator is in a fine operation state in which the operation on the hydraulic actuator is within a predetermined range representing a region of fine operation, and the fine operation state is continued longer than a predetermined period, and fully opens the CB cut valve otherwise.

6 Claims, 9 Drawing Sheets

(51) Int. Cl.
*E02F 9/22* (2006.01)
*F15B 21/08* (2006.01)
*E02F 3/43* (2006.01)

(52) U.S. Cl.
CPC .......... *E02F 9/2282* (2013.01); *E02F 9/2296* (2013.01); *F15B 21/082* (2013.01); *F15B 21/087* (2013.01); *E02F 3/435* (2013.01); *E02F 9/2285* (2013.01); *F15B 2211/329* (2013.01)

(56) References Cited

FOREIGN PATENT DOCUMENTS

| | | | |
|---|---|---|---|
| JP | 2001-82410 | A | 3/2001 |
| JP | 2011-85159 | A | 4/2011 |
| JP | 2012-57409 | A | 3/2012 |
| WO | WO 2014/061741 | A1 | 4/2014 |
| WO | WO 2018/207268 | A1 | 11/2018 |

OTHER PUBLICATIONS

Japanese-language Written Opinion (PCT/ISA/237) issued in PCT Application No. PCT/JP2021/026349 dated Sep. 21, 2021 (five (5) pages).
International Preliminary Report on Patentability (PCT/IB/338 & PCT/IB/373) issued in PCT Application No. PCT/JP2021/026349 dated Jan. 26, 2023, including English translation of document C2 (Japanese-language Written Opinion (PCT/ISA/237), filed on Sep. 9, 2022) (seven (7) pages).

WORK MACHINE

TECHNICAL FIELD

The present invention relates to a work machine, and in particular relates to a work machine that controls driving of hydraulic actuators by using open-center directional control valves.

BACKGROUND ART

Work machines such as hydraulic excavators, wheel loaders or cranes typically have configuration in which a hydraulic fluid delivered by a hydraulic pump driven by a prime mover is supplied to hydraulic actuators. Driving of the hydraulic actuators is controlled by directional control valves that control the direction and flow rate of the hydraulic fluid to be supplied from the hydraulic pump to the hydraulic actuators.

One of types of directional control valve is open-center directional control valves. This type of directional control valve has a meter-in passage that introduces a hydraulic fluid from a hydraulic pump to a hydraulic actuator, and a bleed-off passage that returns the hydraulic fluid to a hydraulic working fluid tank, and the opening areas of both the passages change. Where there is no operation performed on the hydraulic actuator, the opening area of the bleed-off passage is maximized while the meter-in passage is closed. Thereby, the entire volume of the hydraulic fluid delivered from the hydraulic pump flows into the hydraulic working fluid tank via the bleed-off passage of the directional control valve. In contrast, where there is operation performed on the hydraulic actuator, the opening area of the bleed-off passage decreases according to the operation amount of the operation while the opening area of the meter-in passage increases. Thereby, a partial volume or the entire volume of the hydraulic fluid delivered from the hydraulic pump flows into the hydraulic actuator via the meter-in passage of the directional control valve.

An open-center directional control valve has a structure in which the opening areas of both passages are determined by the movement amount (stroke) of a spool as a valve element, and is configured such that the movement amount of the spool (spool stroke) is adjusted according to operation of an operation device. An operator can control behavior, such as position or velocity, of a hydraulic actuator via the directional control valve by operating the operation device, and perform various types of work such as excavation or levelling of ground.

Where accurate work is required, since the operator performs operation with a small operation amount, the spool stroke of the directional control valve is small. In such an operation region, the opening area of the bleed-off passage is larger relative to the opening area of the meter-in passage such that the flow rate of a hydraulic fluid flowing into the hydraulic actuator does not change rapidly relative to the operation amount. Thereby, a shock at the start of movement of the hydraulic actuator is small, the hydraulic actuator moves smoothly, and it is easier to perform velocity control of the hydraulic actuator.

On the other hand, where an operator wishes to move the hydraulic actuator fast, since the operator performs operation with a large operation amount, the spool stroke of the directional control valve becomes larger by a corresponding amount. In such an operation region, the opening area of the bleed-off passage decreases while the opening area of the meter-in passage relatively increases such that the hydraulic fluid from a hydraulic pump flows into the hydraulic actuator in large volume.

The hydraulic fluid returning to the hydraulic working fluid tank via the bleed-off passage of the directional control valve is energy loss (bleed-off loss), thus the amount of such a hydraulic fluid is desirably smaller from a perspective of energy conservation. In view of this, a technology that can realize energy conservation while reducing the occurrence of a sense of discomfort about operation on a work machine has been proposed (see Patent Document 1). In the work machine described in Patent Document 1, a bleed-off flow rate control valve is arranged on a bleed-off line that connects an open-center actuator flow rate control valve (directional control valve) to a tank, and the opening of the bleed-off flow rate control valve is controlled according to the operation amount of an operation device. When the operation amount of the operation device is small, the opening of the bleed-off flow rate control valve (bleed-off opening area) is large, and the bleed-off flow rate increases along with it. As the operation amount increases, the opening of the bleed-off flow rate control valve decreases, and the bleed-off flow rate decreases along with it.

PRIOR ART DOCUMENT

Patent Document

Patent Document 1: WO 2014/061741 A1

SUMMARY OF THE INVENTION

Problem to be Solved by the Invention

Meanwhile, attempts have been made in recent work machines to improve their energy consumption only to such an extent that the operability is not impaired, by changing a relation between the opening area of each passage and the spool stroke of a directional control valve controlling driving of each hydraulic actuator. In particular, attempts have been made to improve the energy consumption by changing the relation in a region with small operation amounts where the ratio of bleed-off loss is large. Specifically, spools that make smaller the opening areas of bleed-off passages at times when the spool strokes are small are adopted more often. That is, a region where the opening area of a bleed-off passage is close to 0 is not limited only to a region where the spool stroke is large (full-operation area) as in conventional technologies, but is expanded to a region (half-operation region) smaller than that. As a result, bleed-off loss is suppressed not only in the full-operation region, but also in the half-operation region.

However, reduction of bleed-off loss by such an improvement of the spool structure of a directional control valve (a relation between the spool stroke and the opening area of each passage) has reached its limit. This is because, as mentioned before, a relatively large opening area of a bleed-off passage is necessary in order to ensure the operability of a hydraulic actuator at start-up or extremely low speed in a region where the spool stroke is small (fine operation region). Accordingly, it is difficult to further reduce the opening area of the bleed-off passage in the region.

In view of this, it is examined here whether it is possible to reduce bleed-off loss by using the bleed-off flow rate control valve described in Patent Document 1, instead of an improvement of the spool structure of a directional control valve. However, in the technology described in Patent Document 1, the opening (bleed-off opening area) of the bleed-off flow rate control valve is controlled according to the operation amount of an operation lever, thus the bleed-off flow rate is determined according to the operation amount. Accordingly, when fine operation on the hydraulic actuator is being continued, the bleed-off flow rate is always large not only at start-up of the hydraulic actuator, but also during movement after the start-up. That is, even if the technology described in Patent Document 1 is used, a reduction effect of the energy consumption (bleed-off loss) during fine operation is predicted to be small.

The present invention has been made on the basis of the matters described above, and an object of the present invention is to provide a work machine that makes it possible to pursue both energy conservation and the operability during fine operation on hydraulic actuators.

Means for Solving the Problem

The present application includes a plurality of means for solving the problems described above. One example thereof is a work machine including: a hydraulic pump driven by a prime mover; a hydraulic actuator driven by a hydraulic fluid supplied from the hydraulic pump; a center bypass line having one side that is connected to a delivery side of the hydraulic pump, and the other side that is connected to a hydraulic working fluid tank; an open-center directional control valve that is arranged on the center bypass line, and controls a flow of the hydraulic fluid to be supplied from the hydraulic pump to the hydraulic actuator; a center bypass cut valve that is arranged on the center bypass line and between the directional control valve and the hydraulic working fluid tank; and a controller that controls an opening of the center bypass cut valve, in which the controller is configured to: restrict the opening of the center bypass cut valve if operation on the hydraulic actuator is in a fine operation state in which the operation on the hydraulic actuator is within a predetermined range representing a region of fine operation, and the fine operation state is continued longer than a predetermined period; and fully open the center bypass cut valve otherwise.

Advantages of the Invention

According to the present invention, restriction of a bleed-off flow rate by the center bypass cut valve is not executed in the initial period of the fine operation on the hydraulic actuator, thus the operability of the hydraulic actuator is not impaired. Additionally, the bleed-off flow rate is reduced by restricting the opening of the center bypass cut valve after the elapse of the predetermined period of the fine operation, thus it is possible to conserve energy. That is, it is possible to pursue both energy conservation and the operability during fine operation on the hydraulic actuator.

Problems, configurations and effects other than those described above are made clear by the following explanation of embodiments.

MODES FOR CARRYING OUT THE INVENTION

Embodiments of a work machine according to the present invention are explained below by using the figures. In the present embodiments, a hydraulic excavator is explained as an example of the work machine.

First Embodiment

Figure 1:
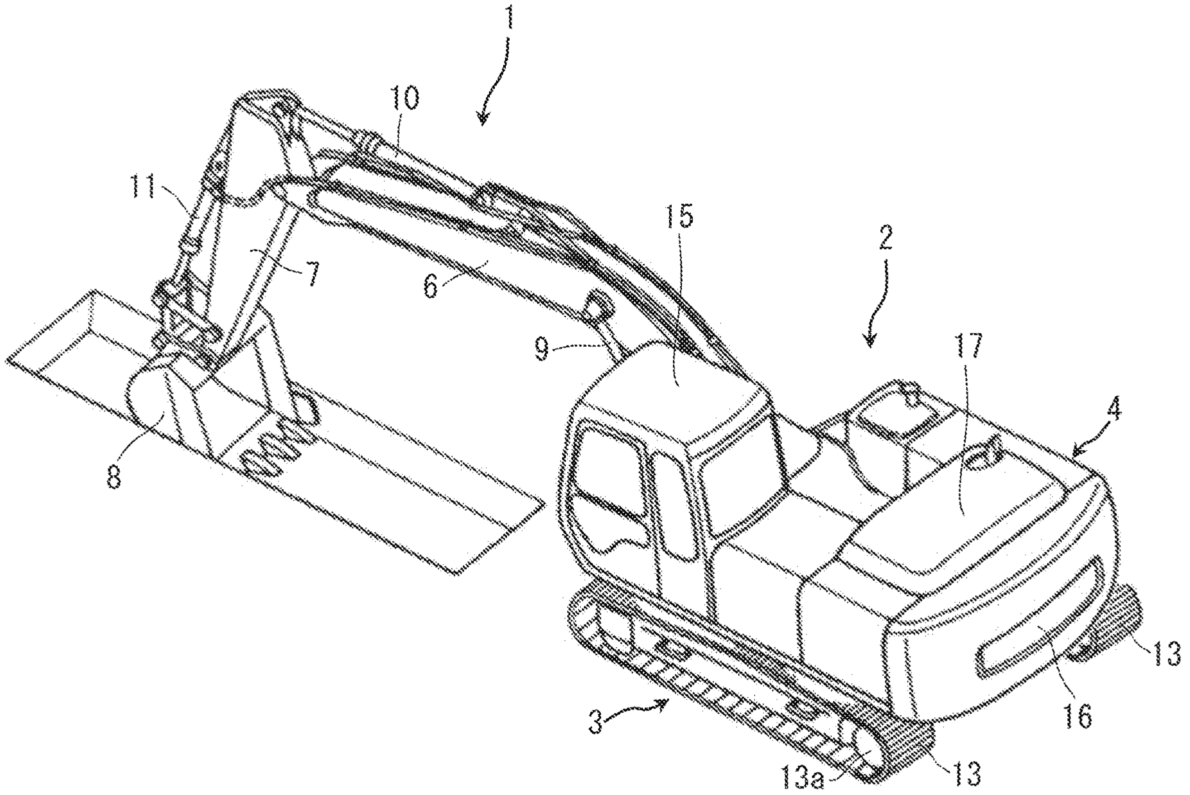
FIG. 1 is a perspective view depicting a hydraulic excavator to which a work machine according to a first embodiment of the present invention is applied.

First, the configuration of a hydraulic excavator as a work machine according to a first embodiment of the present invention is explained by using FIG. 1. FIG. 1 is a perspective view depicting the hydraulic excavator to which the work machine according to the first embodiment of the present invention is applied. Here, a direction as seen from an operator sitting on the operator's seat of the hydraulic excavator is used for an explanation.

In FIG. 1, the hydraulic excavator as the work machine includes an articulated front work implement 1 for performing excavation work or the like and a body 2 to which the front work implement 1 is attached. The body 2 includes a travelable lower travel structure 3 and an upper swing structure 4 mounted swingably on the lower travel structure 3.

The front work implement 1 is provided at a front portion of the upper swing structure 4 such that the front work implement 1 can pivotably move up and down. For example, the front work implement 1 includes a boom 6, an arm 7, and a bucket 8 as a work tool. The base-end side of the boom 6 is pivotably supported at a front portion of the upper swing structure 4. The tip portion of the boom 6 has a base end portion of the arm 7 pivotably attached thereto. A tip portion of the arm 7 has a base end portion of the bucket 8 pivotably attached thereto. The boom 6, the arm 7, and the bucket 8 are driven by a boom cylinder 9, an arm cylinder 10, and a bucket cylinder 11, which are hydraulic actuators, respectively.

The lower travel structure 3 includes left and right crawler-type travel devices 13. The left and right travel devices 13 are driven by travel hydraulic motors 13*a* (only one of them is depicted), which are hydraulic actuators.

The upper swing structure 4 swings relative to the lower travel structure 3 due to a swing hydraulic motor (not depicted), which is a hydraulic actuator. The upper swing structure 4 includes: a cab 15 installed on the front left side on a swing frame (not depicted) as a support structure; a counter weight 16 provided at a rear end portion of the swing frame; and a machine room 17 provided between the cab 15 and the counter weight 16. The operator's seat (not depicted) which an operator sits on, operation devices 41 and 42, an engine control dial 43 mentioned later (see FIG. 2 mentioned later), and the like are arranged in the cab 15. The counter weight 16 is used to adjust the weight balance against the front work implement 1. The machine room 17 houses various types of equipment such as an engine 21 or a hydraulic pump 22 mentioned later (see FIG. 2 mentioned later).

Instructions for action of the boom 6, the arm 7, the bucket 8, and the upper swing structure are given by operation signals from operation lever devices (not depicted). Instructions for action of the lower travel structure are given by operation signals of operation pedal devices (not depicted).

Figure 2:
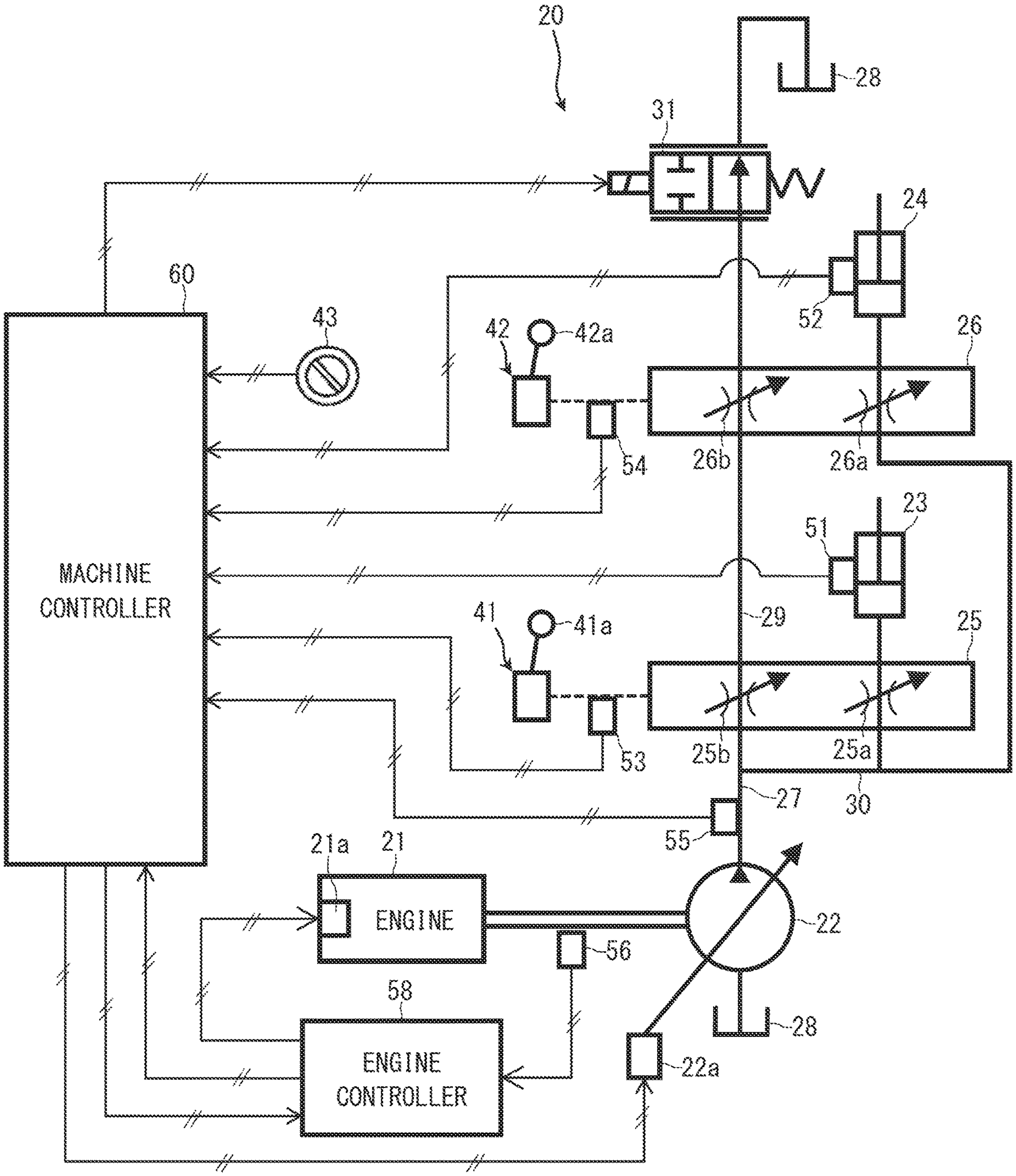
FIG. 2 is a circuit diagram depicting main configuration of a hydraulic system in the work machine according to the first embodiment of the present invention.
Figure 3:
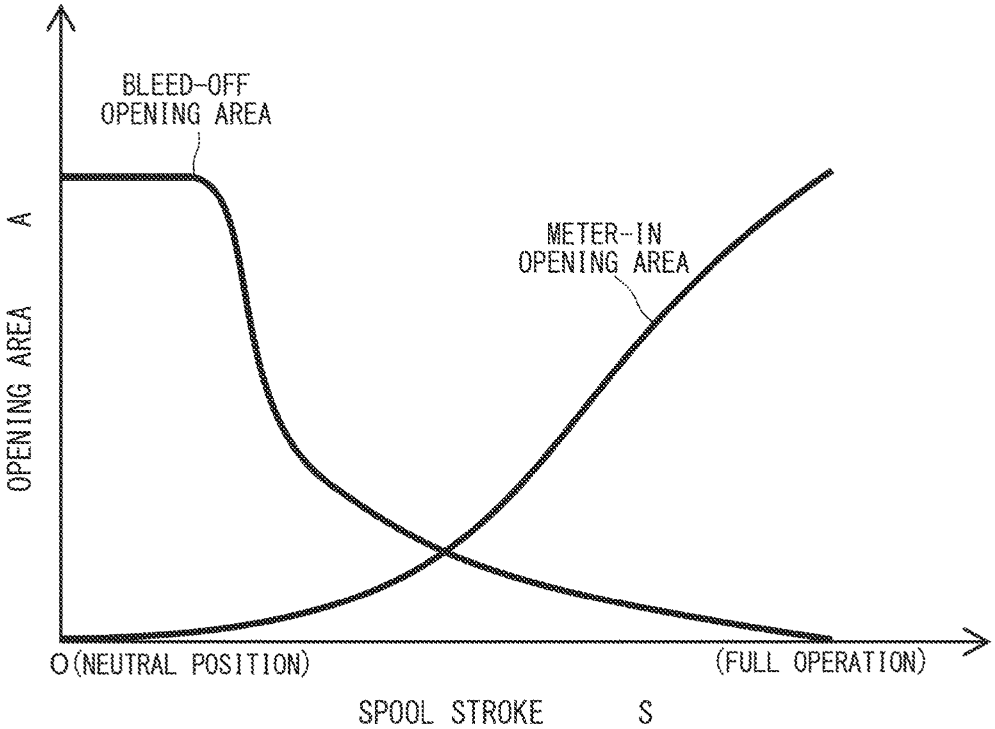
FIG. 3 is a characteristics diagram depicting changes in the bleed-off opening area and meter-in opening area in relation to the spool stroke of a directional control valve included as part of the work machine according to the first embodiment of the present invention.

Next, the main configuration of a hydraulic system in the work machine according to the first embodiment of the present invention is explained by using FIG. 2 and FIG. 3. FIG. 2 is a circuit diagram depicting the main configuration of the hydraulic system in the work machine according to the first embodiment of the present invention. FIG. 3 is a characteristics diagram depicting changes in the bleed-off opening area and meter-in opening area in relation to the spool stroke of a directional control valve included as part of the work machine according to the first embodiment of the present invention.

A hydraulic system 20 depicted in FIG. 2 includes: the hydraulic pump 22 driven by the engine 21 as a prime mover; a first hydraulic actuator 23 and a second hydraulic actuator 24 that are driven by a hydraulic fluid delivered by the hydraulic pump 22; and an open-center first directional control valve 25 and second directional control valve 26 that control flows (directions and flow rates) of the hydraulic fluid to be supplied from the hydraulic pump 22 to the first hydraulic actuator 23 and the second hydraulic actuator 24, respectively. Note that FIG. 2 depicts a circuit for driving the two hydraulic actuators extracted as a representative portion. Circuit that drives a plurality of other hydraulic actuators not depicted FIG. 2 are also configured similarly to the circuit depicted in FIG. 2.

The engine 21 is mechanically coupled to the rotation shaft of the hydraulic pump. The engine 21 has an injection device 21*a* that injects a fuel. The rotation speed of the engine 21 is controlled by an engine controller 58, mentioned later, that adjusts the fuel-injection amount of the injection device 21*a*.

The hydraulic pump 22 is a variable displacement pump, and includes a variable displacement mechanism including a swash plate or an inclined shaft. The hydraulic pump 22 includes a regulator 22*a* that adjusts the pump capacity by controlling the tilting of the swash plate or inclined shaft of the variable displacement mechanism. The regulator 22*a* adjusts the pump capacity based on a command signal from a machine controller 60 mentioned later. The hydraulic pump 22 is connected to the first directional control valve 25 and the second directional control valve 26 via a delivery line 27.

The first hydraulic actuator 23 and the second hydraulic actuator 24 include any of the boom cylinder 9, arm cylinder 10, bucket cylinder 11, left and right travel hydraulic motors 13*a* (see FIG. 1 for all of these), and swing hydraulic motor that are mentioned before. FIG. 2 depicts a hydraulic cylinder as an illustration of an example.

The open-center first directional control valve 25 and second directional control valve 26 are arranged on a center bypass line 29 that introduces the hydraulic fluid delivered from the hydraulic pump 22 to a hydraulic working fluid tank 28 in this order from the hydraulic-pump-22 side to the hydraulic-working-fluid-tank-28 side. The center bypass line 29 extends penetrating the neutral positions of the first directional control valve 25 and second directional control valve 26, and connects the upstream first directional control valve 25 and the downstream second directional control valve 26 in tandem. The center bypass line 29 has one end side (upstream side) which is connected to the delivery line 27, which is the delivery side of the hydraulic pump, and the other end side (downstream side) which is connected to the hydraulic working fluid tank 28. The first directional control valve 25 and the second directional control valve 26 are connected in parallel to the hydraulic pump 22 via a hydraulic-fluid supply line 30, for example.

Each of the first directional control valve 25 and the second directional control valve 26 is a hydraulic pilot-operated valve, and has a spool that moves according to an applied operation pilot pressure. The spools of the directional control valves 25 and 26 are provided with meter-in passages 25*a* and 26*a*, bleed-off passages 25*b* and 26*b*, and meter-out passages (not depicted), respectively. The meter-in passages 25*a* and 26*a* of the directional control valves 25 and 26 are passages for establishing communication between the delivery line 27 and the meter-in sides of the hydraulic actuators 23 and 24. The opening areas of the meter-in passages 25*a* and 26*a* of the directional control valves 25 and 26 are referred to as meter-in opening areas. The bleed-off passages 25*b* and 26*b* of the directional control valves 25 and 26 are passages for establishing communication between the delivery line 27 and the center bypass line 29. The opening areas of the bleed-off passages 25*b* and 26*b* of the directional control valves 25 and 26 are referred to as bleed-off opening areas. The meter-out passages of the directional control valves 25 and 26 are passages for establishing communication between the meter-out sides of the hydraulic actuators 23 and 24 and the hydraulic working fluid tank 28. The opening areas of the meter-out passages of the directional control valves 25 and 26 are referred to as meter-out opening areas. As the spool of each of the directional control valves 25 and 26 moves, the ratios among the three opening areas, the meter-in opening area, bleed-off opening area, and meter-out opening area, change. As the ratios among the three opening areas described above change according to the spool stroke of each of the directional control valves 25 and 26, the delivery flow rate of the hydraulic pump 22 is distributed to the hydraulic actuators 23 and 24 and the hydraulic working fluid tank 28, and driving (directions, positions, velocities, etc.) of the hydraulic actuators 23 and 24 is adjusted. That is, the hydraulic actuators 23 and 24 are driven at velocities proportional to the flow rates of the hydraulic fluid passing through the meter-in passages 25*a* and 26*a* of the directional control valves 25 and 26. The hydraulic fluid having passed through the bleed-off passages 25*b* and 26*b* of the directional control valves 25 and 26 is returned to the hydraulic working fluid tank 28 without being supplied to the hydraulic actuators 23 and 24.

The first directional control valve 25 and the second directional control valve 26 are operated by a first operation device 41 and a second operation device 42, respectively. The first operation device 41 and the second operation device 42 give instructions for movement of the first hydraulic actuator 23 and the second hydraulic actuator 24, respectively, via operation by an operator, and have operation levers 41*a* and 42*a* to be operated by the operator, for example. For example, the first operation device 41 and the second operation device 42 are configured to function as pressure reducing valves that reduce the hydraulic pressures of pressure sources (pilot pumps which are not depicted) to generate operation pilot pressures according to operation amounts. The operation pilot pressures generated by the operation devices 41 and 42 according to the operation amounts act on the spools of the directional control valves 25 and 26, and thereby the spool strokes of the directional control valves 25 and 26 are generated according to the operation pilot pressures.

The relation between the meter-in opening area and the bleed-off opening area relative to the spool stroke of each of the directional control valves 25 and 26 is as represented by the characteristics diagram depicted in FIG. 3, for example. In FIG. 3, the horizontal axis S represents the spool strokes of the directional control valves 25 and 26, and the longitudinal axis A represents the meter-in opening areas and bleed-off opening areas of the directional control valves 25 and 26.

Where the operation levers 41*a* and 42*a* are neutral, that is, where the operation amounts of the operation levers 41*a* and 42*a* are 0, the spool strokes of the directional control valves 25 and 26 are 0 (the spools are at their neutral positions). At this time, while the bleed-off opening areas of the directional control valves 25 and 26 are maximized (the bleed-off passages 25*b* and 26*b* are fully opened), their meter-in opening areas are 0 (the meter-in passages 25*a* and 26*a* are fully closed). Because of this, the hydraulic actuators 23 and 24 corresponding to the directional control valves 25 and 26 are not driven.

In a region where the operation amounts of the operation levers 41*a* and 42*a* are small, the spool strokes are also small according to the operation amounts. While the bleed-off opening areas decrease according to the spool strokes (operation amounts), the meter-in opening areas increase. Thereby, while part of the hydraulic fluid from the hydraulic pump 22 flows into the hydraulic actuators 23 and 24 via the meter-in passages 25*a* and 26*a* of the directional control valves 25 and 26, the remaining hydraulic fluid returns to the hydraulic working fluid tank 28 via the bleed-off passages 25*b* and 26*b*.

Where the operation amounts of the operation levers 41*a* and 42*a* are maximized (in a case of full operation), the spool strokes are also maximized according to the maximum operation amounts. At this time, while the bleed-off opening areas are 0 (the bleed-off passages 25*b* and 26*b* are fully closed), the meter-in opening areas are maximized. Thereby, while the entire volume of the hydraulic fluid from the hydraulic pump 22 flows into the hydraulic actuators 23 and 24 via the meter-in passages 25*a* and 26*a*, the flow rate of the hydraulic fluid returning to the hydraulic working fluid tank 28 is 0.

A center bypass cut valve (hereinafter, referred to as a CB cut valve) 31 is provided between the hydraulic working fluid tank 28 and the second directional control valve 26 which is located at the most downstream portion on the center bypass line 29. The CB cut valve 31 has an opening area which is continuously changeable, and is a proportional solenoid valve, for example. The opening (opening area) of the CB cut valve 31 is controlled by a control command of the machine controller 60. Along with the first directional control valve 25 and the second directional control valve 26, the CB cut valve 31 adjusts the flow rate, which is a so-called bleed-off flow rate, of the hydraulic fluid flowing from the hydraulic pump 22 to the hydraulic working fluid tank 28 via the center bypass line 29.

The first hydraulic actuator 23 and the second hydraulic actuator 24 are provided with a first stroke sensor 51 and a second stroke sensor 52, respectively. The first stroke sensor 51 and the second stroke sensor 52 sense the stroke of the first hydraulic actuator 23 and the stroke of the second hydraulic actuator 24, respectively, and output, to the machine controller 60, sensing signals according to the sensed stroke of the first hydraulic actuator 23 and the sensed stroke of the second hydraulic actuator 24, respectively.

The operation pilot pressures generated by the first operation device 41 and the second operation device 42 are sensed by a first pressure sensor 53 and a second pressure sensor 54, respectively. The first pressure sensor 53 and the second pressure sensor 54 output sensing signals according to the sensed operation pilot pressures to the machine controller 60. The first pressure sensor 53 and the second pressure sensor 54 function as operation amount sensors that sense the operation amounts of the first operation device 41 and the second operation device 42, respectively. The delivery line 27 is provided with a third pressure sensor 55 that senses the delivery pressure of the hydraulic pump 22. Third pressure sensor 55 outputs a sensing signal according to the sensed delivery pressure to the machine controller 60.

The engine 21 is provided with a rotation speed sensor 56 that senses the actual rotation speed of the engine 21. The rotation speed sensor 56 outputs a sensing signal according to the sensed actual rotation speed to the engine controller 58.

The engine controller 58 is configured to bidirectionally communicate with the machine controller 60. While the engine controller 58 receives a target rotation speed of the engine 21 from the machine controller 60, the engine controller 58 transmits, to the machine controller 60, the actual rotation speed of the engine 21 input from the rotation speed sensor 56. The engine controller 58 computes a command value for such a fuel-injection amount that the actual rotation speed of the engine 21 sensed by the rotation speed sensor 56 is caused to match the target rotation speed from the machine controller 60, and outputs the computation-result command value to the injection device 21*a*.

The machine controller 60 is electrically connected with an engine control dial (hereinafter, referred to as an EC dial) 43. The EC dial 43 gives an instruction for a set rotation speed of the engine 21 according to operation by an operator, and outputs an instruction signal of the set rotation speed to the machine controller 60.

On the basis of the set rotation speed from the EC dial 43, operation of the operation devices 41 and 42, and the like, the machine controller 60 decides a target rotation speed of the engine 21, and outputs the decided target rotation speed to the engine controller 58. That is, the machine controller 60 controls the rotation speed of the engine 21 via the engine controller 58. In addition, according to the states of operation on the first hydraulic actuator 23 and the second hydraulic actuator 24, the machine controller 60 controls the opening (opening area) of the CB cut valve 31, and controls the pump displacement (delivery flow rate) of the hydraulic pump 22.

Figure 4:
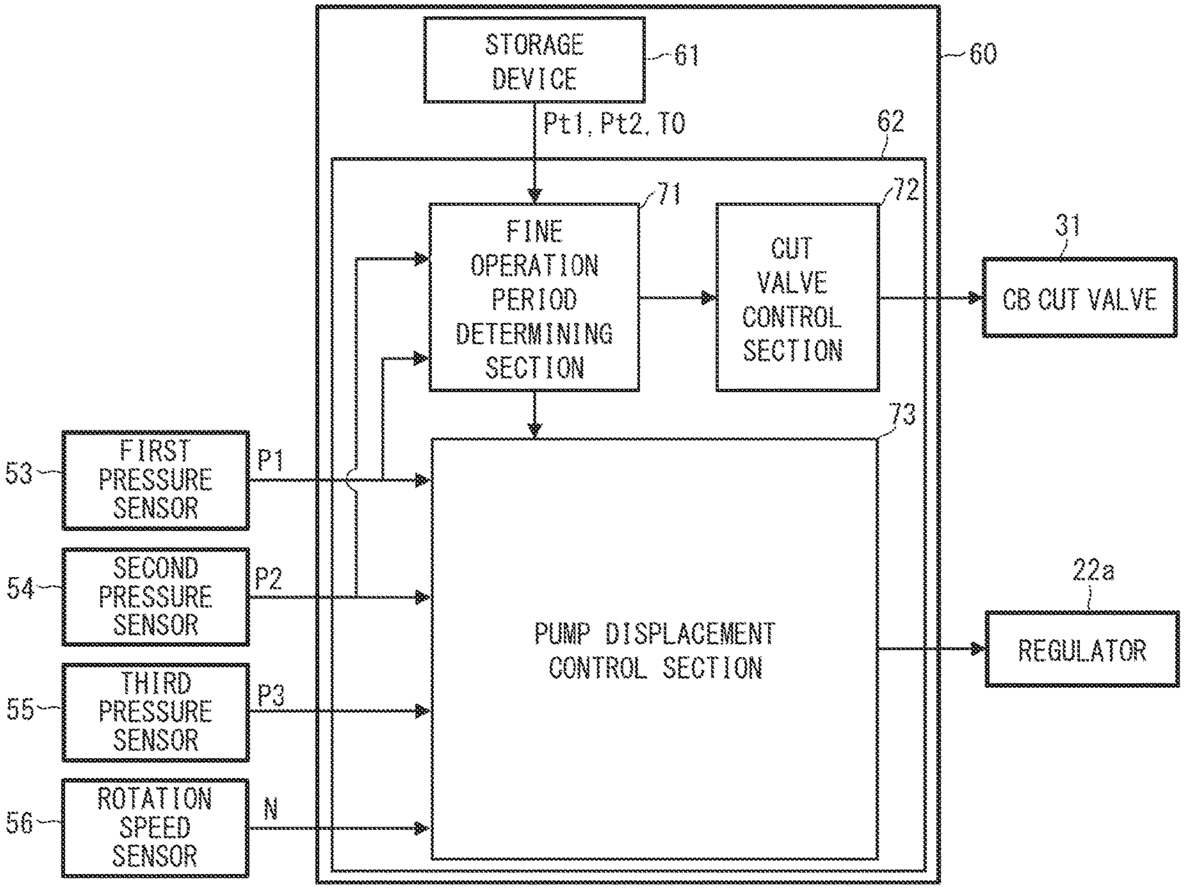
FIG. 4 is a block diagram depicting the functional configuration of a controller included as part of the work machine according to the first embodiment of the present invention.

Next, the hardware configuration and functional configuration of the machine controller included in the work machine according to the first embodiment of the present invention are explained by using FIG. 4. FIG. 4 is a block diagram depicting the functional configuration of the controller included as part of the work machine according to the first embodiment of the present invention.

Control of the opening (opening area) of the CB cut valve 31 and control of the pump displacement (delivery flow rate) of the hydraulic pump 22 by the machine controller 60 are based on the following perspective.

In recent years, reduction of bleed-off loss of work machines attained by an improvement in the spool structure of an open-center directional control valve (a relation of the bleed-off opening area relative to the spool stroke) has reached its limit. This is because a relatively large bleed-off opening area is necessary in a region of fine operation where the spool stroke is small (an operation region where the operation amount of an operation device is small) in order to ensure the operability of a hydraulic actuator at start-up or extremely low speed. Accordingly, it is difficult to further reduce the bleed-off opening area in the region of the fine operation, thus it is not possible to attempt to further reduce bleed-off loss.

In view of this, first, separation of a period when fine operation on a hydraulic actuator is performed into a first period and a second period is considered. The first period is a transitory period in which the drive state of the hydraulic actuator is an unstable state due to its transition from a stationary state to a movement starting state, and the second period is a period in which the drive state of the hydraulic actuator is a stable state with smooth movement after the elapse of the first period. In the first period, it is necessary to take into consideration factors that have a negative influence on the operability including, among others, stick-slip, shocks, and the like at the start of movement of the hydraulic actuator. Accordingly, a relatively large bleed-off flow rate is required, placing importance on the operability. In contrast, in the second period, the hydraulic actuator has reached a stable drive state where it has already started moving, and the influence of the factors described above that have a negative influence on the operability has been reduced. Accordingly, a relatively large bleed-off flow rate is not necessarily necessary.

Control of the CB cut valve 31 by the machine controller 60 is one that adopts the way of thinking mentioned above. In summary, in the second period during fine operation on the hydraulic actuator 23 or 24, the bleed-off flow rate is reduced by restricting (reducing) the opening (opening area) of the CB cut valve 31. Thereby, bleed-off loss can be reduced. On the other hand, in the first period during the fine operation, the bleed-off flow rate is kept as in conventional technologies by fully opening the CB cut valve 31 without restricting the opening (opening area) of the CB cut valve 31. Thereby, deterioration of the operability can be prevented.

Specifically, in FIG. 4, for example, the hardware configuration of the machine controller 60 includes a storage device 61 including a RAM, a ROM, or the like, and a processor 62 including a CPU, an MPU, or the like. The storage device 61 has stored in advance various types of information including programs necessary for control of the CB cut valve 31 and control of the hydraulic pump 22. The processor 62 reads in programs and various types of information from the storage device 61 as appropriate, executes processes in accordance with the programs, and thereby realizes various types of functionality including the following functionalities.

The machine controller 60 includes, as functionalities to be executed by the processor 62, a fine operation period determining section 71, a cut valve control section 72, and a pump displacement control section 73.

The fine operation period determining section 71 determines whether or not operation on the first hydraulic actuator 23 or the second hydraulic actuator 24 is in a fine operation state in which the operation on the first hydraulic actuator 23 or the second hydraulic actuator 24 is within a predetermined range representing a region of fine operation, and the fine operation state is continued longer than a predetermined period. The subject of the determination is a hydraulic actuator that is either one of the first hydraulic actuator 23 and the second hydraulic actuator 24, and is being operated with a relatively large operation amount, and a hydraulic actuator that is being operated with a relatively small operation amount is not considered. The predetermined period about the fine operation is equivalent to the first period mentioned before, and it is supposed that the predetermined period is a transitory period in which the state of the first hydraulic actuator 23 or the second hydraulic actuator 24 is an unstable drive state due to its transition from a stationary state to a movement starting state caused by the start of the fine operation. On the other hand, the period after the continuation of the fine operation longer than the predetermined period is equivalent to the second period mentioned before, and it is supposed that the period is a period in which the state of the first hydraulic actuator 23 or the second hydraulic actuator 24 is a stable drive state where the first hydraulic actuator 23 or the second hydraulic actuator 24 is driven smoothly after the start of movement.

Specifically, first, the fine operation period determining section 71 determines whether or not operation on the hydraulic actuator 23 or 24 is in the fine operation state. For example, it is determined whether or not the operation amount of the first operation device 41 or the second operation device 42 is within the predetermined range representing the region of the fine operation. Specifically, for example, the fine operation period determining section 71 determines whether or not an operation pilot pressure P1 of the first operation device 41 or an operation pilot pressure P2 of the second operation device 42 (the operation amount of the first operation device 41 or the second operation device 42) sensed by the first pressure sensor 53 or the second pressure sensor 54 is within the predetermined range representing the fine operation region. The determination is made by using an operation pilot pressure (operation amount) with a relatively larger sensing value in the operation pilot pressures P1 and P2 (the operation amounts of the first operation device 41 and the second operation device 42) sensed by the first pressure sensor 53 and the second pressure sensor 54. For example, the predetermined range representing the region of the fine operation is larger than a preset first threshold Pt1 and less than a preset second threshold Pt2 (Pt2>Pt1). The first threshold Pt1 and the second threshold Pt2 are stored in the storage device 61 in advance, and, for example, are 0.5 [MPa] and 2.5 [MPa], respectively. The first threshold Pt1 is a value that is set for excluding the region of a deadband where driving of the hydraulic actuator 23 or 24 does not occur even if the operation device 41 or 42 is operated. The second threshold Pt2 is an operation pilot pressure (operation amount) defining the upper limit of the fine operation region, and is, for example, a value equivalent to approximately 40% to 50% of an operation pilot pressure (operation amount) at a time of full operation at which the operation pilot pressure of the operation device 41 or 42 is maximized.

Furthermore, when the fine operation period determining section 71 determines that operation (the operation amount) of the first operation device 41 or the second operation device 42 is in the fine operation state in which the operation of the first operation device 41 or the second operation device 42 is within the predetermined range representing the fine operation region, the fine operation period determining section 71 measures elapsed time t of the continuation of the fine operation, and determines whether or not the measured elapsed time t has exceeded a predetermined period (a time threshold T0). The time threshold T0 is stored in the storage device 61 in advance, and is two seconds, for example. The fine operation period determining section 71 outputs, to the cut valve control section 72 and the pump displacement control section 73, a result of the determination whether or not the elapsed time (duration) t of the fine operation has exceeded the time threshold T0.

The cut valve control section 72 controls the opening (opening area) of the CB cut valve 31 according to the result of the determination by the fine operation period determining section 71. Specifically, when the result of the determination by the fine operation period determining section 71 is NO, the cut valve control section 72 outputs, to the CB cut valve 31, a valve control command for fully opening the CB cut valve 31. On the other hand, when the result of the determination by the fine operation period determining section 71 is YES, the cut valve control section 72 outputs, to the CB cut valve 31, such a valve control command that the opening (opening area) of the CB cut valve 31 is restricted (reduced) gradually along with the elapse of time, and the CB cut valve 31 is fully closed in the end. The reduction rate of the opening area of the CB cut valve 31 is set from a perspective of prevention of deterioration of the operability during fine operation on the hydraulic actuator 23 or 24 due to a rapid reduction of the bleed-off flow rate caused by full closing of the CB cut valve 31.

The pump displacement control section 73 controls the pump displacement of the hydraulic pump 22 according to the result of the determination by the fine operation period determining section 71. Specifically, for example, the pump displacement control section 73 has stored a table of reference pump capacities relative to operation pilot pressures in advance, and computes, in accordance with the table, a reference pump capacity corresponding to the operation pilot pressures P1 and P2 of the first operation device 41 and the second operation device 42 sensed by the first pressure sensor 53 and the second pressure sensor 54, respectively. When the result of the determination by the fine operation period determining section 71 is NO, the pump displacement control section 73 outputs, to the regulator 22*a*, a pump control command for setting the computation-result reference pump capacity as a target pump capacity.

On the other hand, when the result of the determination by the fine operation period determining section 71 is YES, the pump displacement control section 73 computes a correction capacity for reducing the pump capacity according to a reduction of the opening area of the CB cut valve 31 by the cut valve control section 72. Furthermore, such a target pump capacity that the computation-result reference pump capacity is gradually reduced on the basis of the computation-result correction capacity is set, and a pump control command for the set target pump capacity is output to the regulator 22*a*.

Specifically, in accordance with the following relational expressions (1) and (2), the pump displacement control section 73 computes a bleed-off flow rate Q at a time when the CB cut valve 31 is fully opened.

$$Q=C\times As\times\sqrt{(2\times P/\rho)} \quad (1)$$

$$As=Ab1\times Ab2/\sqrt{(Ab1\hat{\ }2+Ab2\hat{\ }2)} \quad (2)$$

It should be noted that Ab1 is the bleed-off opening area of the first directional control valve 25, Ab2 is the bleed-off opening area of the second directional control valve 26, As is the combined opening area of both the bleed-off opening areas of the first directional control valve 25 and the second directional control valve 26 connected in series to the center bypass line 29, C is a flow rate coefficient, P is the delivery pressure of the hydraulic pump 22, and ρ is the density of the fluid. The bleed-off opening areas Ab1 and Ab2 of the first directional control valve 25 and the second directional control valve 26 can be estimated on the basis of sensing values (the operation pilot pressures P1 and P2) sensed by the first pressure sensor 53 and the second pressure sensor 54, respectively. A sensing value P3 sensed by the third pressure sensor 55 can be used as the delivery pressure P of the hydraulic pump 22. The flow rate coefficient C and the density ρ of the fluid are preset constants.

Next, the pump displacement control section 73 computes the correction capacity by dividing the computation-result bleed-off flow rate Q by the rotation speed of the hydraulic pump 22 computed based on the actual rotation speed N of the engine 21 sensed by the rotation speed sensor 56. The bleed-off flow rate Q is equivalent to the bleed-off flow rate that decreases due to switching of the CB cut valve 31 from the fully-opened state to the fully-closed state, and the computation-result correction capacity is equivalent to the pump capacity that becomes unnecessary at a time of switching of the CB cut valve 31 to the fully-closed state. The pump displacement control section 73 sets such a target pump capacity that the reference pump capacity is reduced by an amount corresponding to the computation-result correction capacity in the period for switching of the CB cut valve 31 from the fully-opened state to the fully-closed state set by the cut valve control section 72. That is, the pump displacement control section 73 reduces the pump flow rate by an amount corresponding to the bleed-off flow rate Q that decreases according to control of switching of the CB cut valve 31 from the fully-opened state to the fully-closed state. The pump displacement control section 73 gradually reduces the pump capacity of the hydraulic pump 22 particularly in conjunction with gradual reduction of the opening area of the CB cut valve 31 by the cut valve control section 72.

Figure 5:
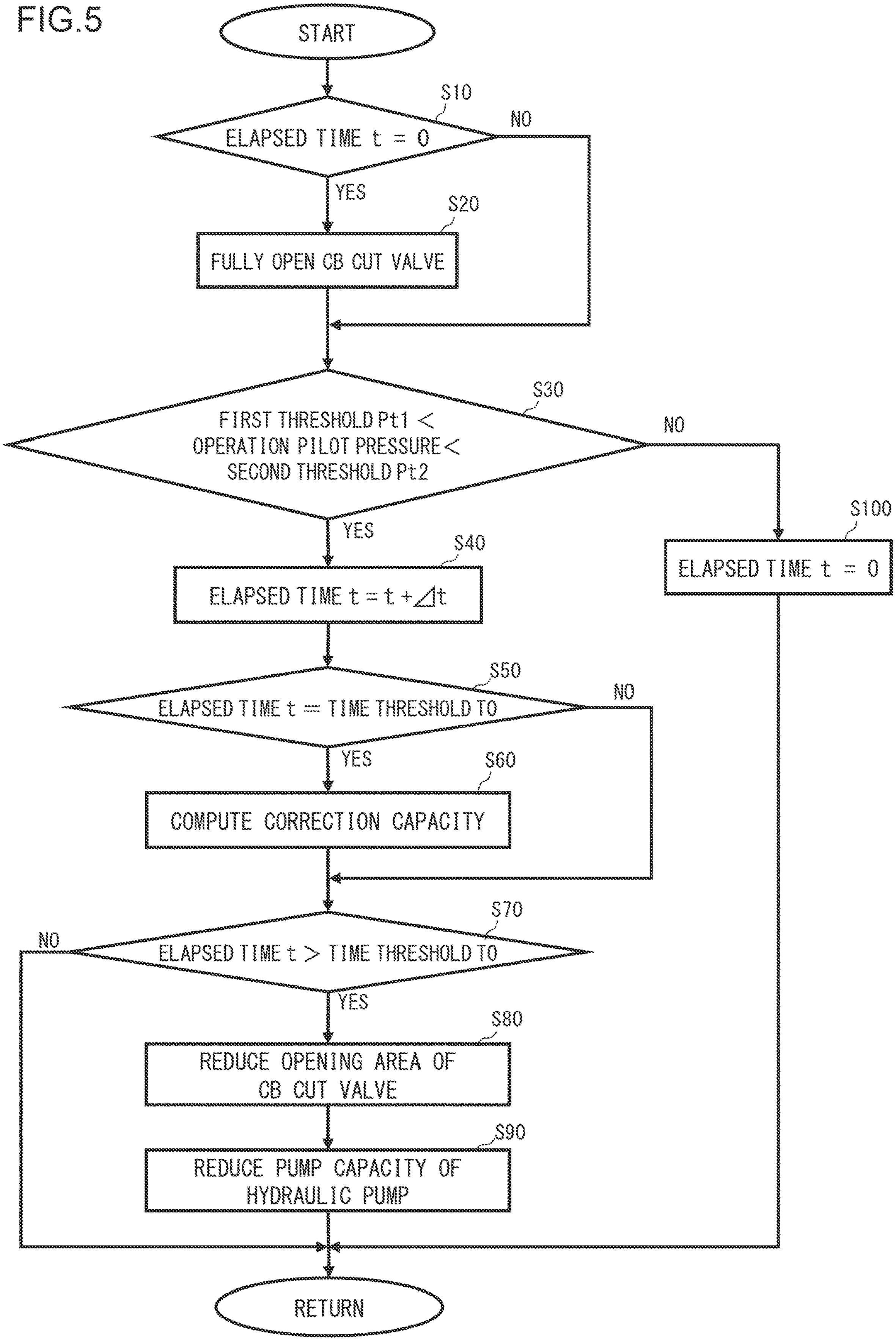
FIG. 5 is a flowchart depicting an example of a control procedure of the controller included as part of the work machine according to the first embodiment of the present invention.

Next, a procedure of controlling the CB cut valve 31 and hydraulic pump 22 by the machine controller included in the work machine according to the first embodiment of the present invention is explained by using FIG. 5. FIG. 5 is a flowchart depicting an example of a control procedure by the controller included as part of the work machine according to the first embodiment of the present invention.

Control of the CB cut valve 31 and hydraulic pump 22 by the machine controller 60 depicted in FIG. 5 (steps from START to RETURN) is executed repeatedly at predetermined control intervals Δt, for example. For example, the control process is started by ON operation on a key switch which is not depicted and gives an instruction for activating the hydraulic excavator.

First, the machine controller 60 (fine operation period determining section 71) determines whether or not the elapsed time t is 0 (t=0) (Step S10). The elapsed time t is a time elapsed since fine operation on the hydraulic actuator 23 or 24 is started. Whether or not there is fine operation is determined at Step S30 mentioned later. The elapsed time T which is not 0 means that operation on the hydraulic actuator 23 or 24 is the fine operation state. On the other hand, the elapsed time t which is 0 means that there is no operation or there is operation exceeding the fine operation region. The elapsed time t is initially set to 0 before control intervals.

When the result of the determination at Step S10 is YES (elapsed time t=0), the machine controller 60 (cut valve control section 72) outputs, to the CB cut valve 31, a valve control command for fully opening the CB cut valve 31 (Step S20), and proceeds to Step S30. Thereby, the CB cut valve 31 is switched to the fully-opened state or keeps the fully-opened state. On the other hand, when the result of the determination at Step S10 is NO (elapsed time t≠0), the machine controller 60 proceeds to Step S30 without executing Step S20.

Next, the machine controller 60 (fine operation period determining section 71) determines whether or not the operation (operation amount) of the first operation device 41 or the second operation device 42 is within the predetermined range representing the fine operation region (Step S30). Specifically, it is determined whether or not the operation pilot pressure of the first operation device 41 or the second operation device 42 sensed by the first pressure sensor 53 or the second pressure sensor 54 is in a range larger than the first threshold Pt1 and less than the second threshold Pt2. Note that the determination is made by using a relatively larger sensing value in the operation pilot pressures P1 and P2 (the operation amounts of the first operation device 41 and the second operation device 42) sensed by the first pressure sensor 53 and the second pressure sensor 54.

When the result of the determination at Step S30 is NO, that is, when operation on the hydraulic actuator 23 or 24 is not in the fine operation state, the fine operation period determining section 71 proceeds to Step S100, and sets the elapsed time t to 0 (t=0). After execution of Step S100, the process returns to START, and Step S30 is executed again via Steps S10 and S20. On the other hand, when the result of the determination at Step S30 is YES, that is, when the operation on the hydraulic actuator 23 or 24 is in the fine operation state, the procedure proceeds to Step S40.

At Step S40, the fine operation period determining section 71 starts or continues measuring the elapsed time t. Specifically, the elapsed time t is increased by one control interval Δt. That is, this means that the fine operation is continued for the period of the one control interval Δt.

Next, the fine operation period determining section 71 determines whether or not the elapsed time t has reached the time threshold T0 (Step S50). If the elapsed time t has reached the time threshold T0, this is equivalent to the elapse of the first period during fine operation mentioned before. That is, it is supposed that, in this state, the hydraulic actuator 23 or 24 which is being subjected to the fine operation has transitioned from the unstable drive state at start-up to the stable drive state. When the result of the determination at Step S50 is YES, the fine operation period determining section 71 proceeds to Step 60. On the other hand, when the result of the determination is NO, the fine operation period determining section 71 proceeds to Step S70 without executing Step S60.

At Step 60, the machine controller 60 (pump displacement control section 73) computes a correction displacement, and proceeds to Step S70. As mentioned before, the correction displacement is a pump capacity according to a pump flow rate that becomes unnecessary according to the bleed-off flow rate Q that decreases due to switching of the CB cut valve 31 from the fully-opened state to the fully-closed state. As mentioned before, the correction displacement can be computed based on the relational expressions (1) and (2) described above and the rotation speed of the hydraulic pump 22 (the rotation speed N of the engine 21).

Next, the machine controller 60 (fine operation period determining section 71) determines whether or not the elapsed time t has exceeded the time threshold T0 (Step S70). When the result of the determination at Step S70 is NO, the process returns to START again, and, at Step S30 after Step S10 again, it is determined whether or not the operation pilot pressure (operation amount) of the operation device 41 or 42 is within the predetermined range representing the fine operation region (i.e. whether or not the operation on the hydraulic actuator 23 or 24 is the fine operation state). Where the fine operation on the hydraulic actuator 23 or 24 is continued, the machine controller 60 sequentially repeats execution of Steps S10, S30, S40, S50, and S70 again and again. When the elapsed time t exceeds the time threshold T0, the result of the determination at Step S70 becomes YES, and the process proceed to Step S80.

At Step S80, the machine controller 60 (cut valve control section 72) outputs, to the CB cut valve 31, such a valve control command that the opening area of the CB cut valve 31 is reduced by a predetermined amount in one control interval Δt. The reduction amount of the opening area of the CB cut valve 31 is a value computed supposing that switching of the CB cut valve 31 from the fully-opened state to the fully-closed state is completed in a certain period. That is, the cut valve control section 72 gradually reduces the opening area of the CB cut valve 31 according to an increase in the elapsed time t of the fine operation on the operation device 41 or 42 (the fine operation on the hydraulic actuator 23 or 24).

Next, the machine controller 60 (pump displacement control section 73) outputs, to the regulator 22*a*, a pump control command for reducing the reference pump capacity of the hydraulic pump 22 mentioned before (a capacity corresponding to the operation pilot pressures P1 and P2 of the first operation device 41 and the second operation device 42) by a certain amount in the control interval Δt (Step S90). This is for gradually reducing the pump capacity of the hydraulic pump 22 in conjunction with a reduction of the opening area of the CB cut valve 31. The reduction amount of the pump capacity is a value set such that the reference pump capacity decreases by an amount corresponding to the correction capacity computed at S60 in a period (a given period) for switching the CB cut valve 31 from the fully-opened state to the fully-closed state. After the execution of Step S90, the machine controller 60 returns to START.

Where the fine operation on the operation device 41 or 42 (the fine operation on the hydraulic actuator 23 or 24) is continued longer than the predetermined period (time threshold T0), the machine controller 60 sequentially repeats execution of Steps S10, S30, S40, S50, S70, S80, and S90 again and again. Thereby, the CB cut valve 31 is switched from the fully-opened state to the fully-closed state gradually, and the fully-closed state is kept until the end of the fine operation. In addition, the pump flow rate of the hydraulic pump 22 gradually decreases according to the control of switching the CB cut valve 31 to the fully-closed state, and becomes a flow rate that has decreased by an amount corresponding to the bleed-off flow rate at a time of the fully-opened state of the CB cut valve 31 in the end, and this state is kept until the end of the fine operation.

Figure 6:
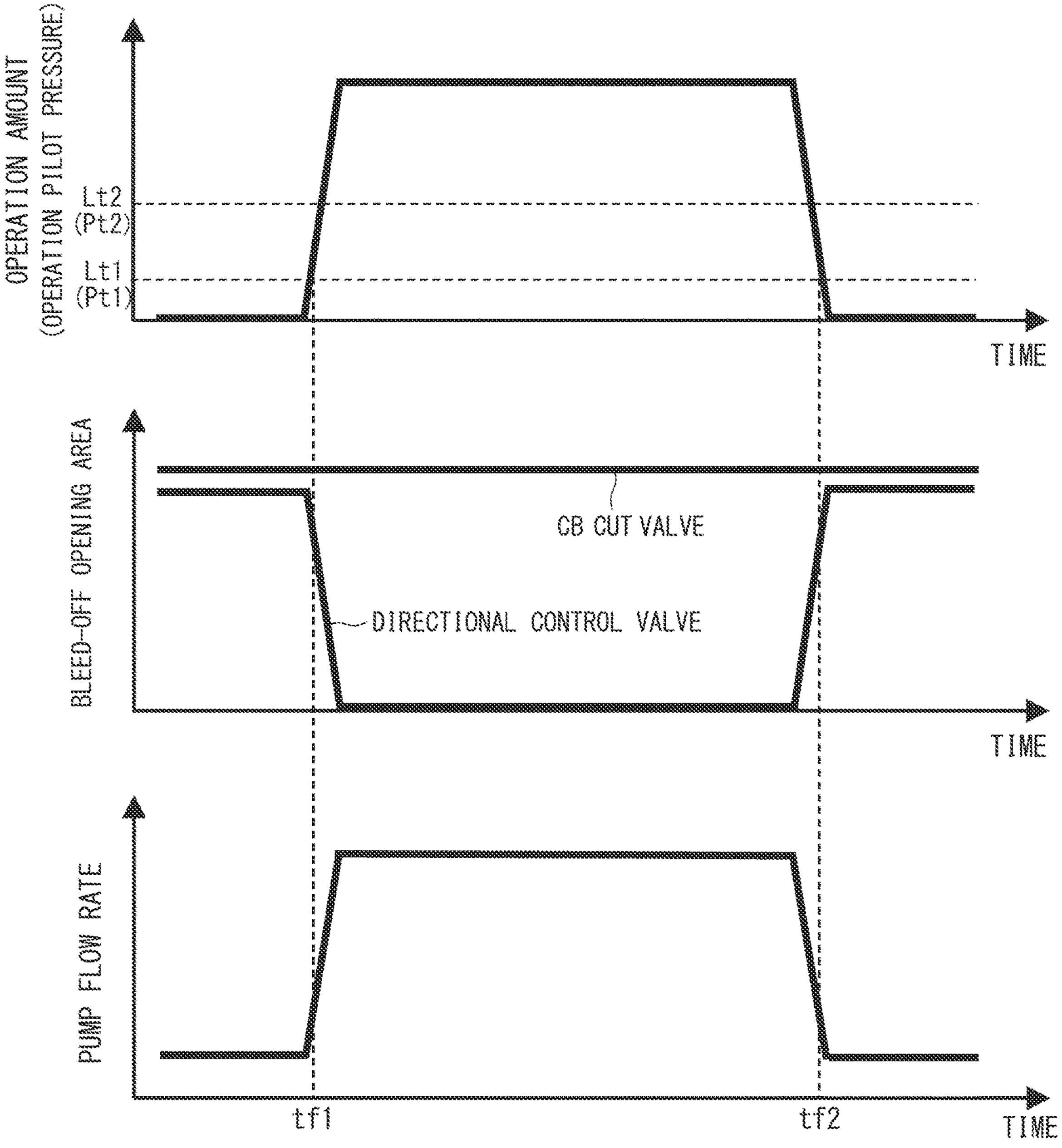
FIG. 6 is a figure depicting an example of the behavior over time of each element in the hydraulic system during full operation in the work machine according to the first embodiment of the present invention.
Figure 7:
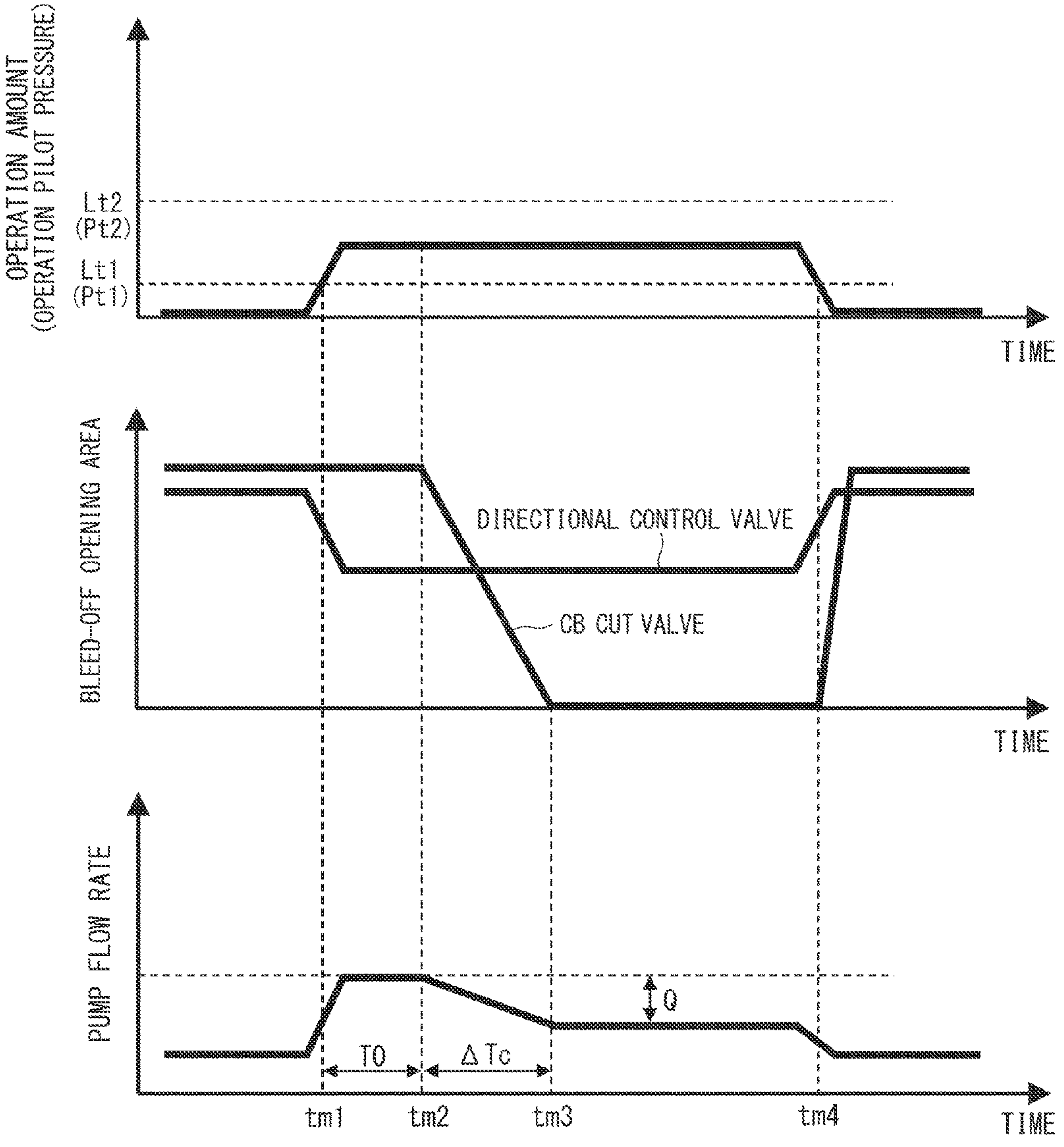
FIG. 7 is a figure depicting an example of the behavior over time of each element in the hydraulic system during fine operation in the work machine according to the first embodiment of the present invention.

The behavior of the directional control valves, the CB cut valve, and the hydraulic pump during full operation and fine operation in the work machine according to the first embodiment of the present invention is explained by using FIG. 5 to FIG. 7. First, the behavior of each element of equipment during full operation is explained by using FIG. 5 and FIG. 6. FIG. 6 is a figure depicting an example of the behavior over time of each element in the hydraulic system during full operation in the work machine according to the first embodiment of the present invention.

The top diagram in FIG. 6 depicts a state where "full operation" on the operation device 41 or 42 (see FIG. 2) is continued for a certain period. The operation amount of (operation on) the operation device 41 or 42, which is 0 at a time when it is stopped, exceeds a first threshold Lt1 at time tf1, and then reaches the maximum value (full operation) significantly exceeding a second threshold Lt2. The full operation is kept for a certain period, and ends at a time point after time tf2. The first threshold Lt1 represents the upper limit of the deadband, and corresponds to the first threshold Pt1 of the operation pilot pressure. Where the operation amount of the operation device 41 or 42 is equal to or smaller than the first threshold Lt1, the hydraulic actuator 23 or 24 is not driven even if operation of the operation device 41 or 42 is performed. The second threshold Lt2 represents the upper limit of the fine operation region related to the operation amount of the operation device 41 or 42, and corresponds to the second threshold Pt2 of the operation pilot pressure.

At this time, the spool of the directional control valve 25 or 26 (see FIG. 2) moves to the maximum position due to the operation pilot pressure generated according to the full operation of the operation device 41 or 42. Thereby, as depicted in the middle diagram in FIG. 6, the bleed-off opening area of the directional control valve 25 or 26 decreases from the maximum value at a time of an operation stop to 0. When the full operation ends, the spool returns to the neutral position, and thereby the bleed-off opening area returns to the maximum value.

On the other hand, during the full operation, the CB cut valve 31 (see FIG. 2) is kept fully opened by the machine controller 60. That is, as depicted in the middle diagram in FIG. 6, the bleed-off opening area of the CB cut valve 31 is kept at the maximum value. This is achieved by the following control process by the machine controller 60. during the full operation of the operation device 41 or 42, the operation pilot pressure sensed by the pressure sensor 53 or 54 becomes greater than the second threshold Pt2 mentioned above. Accordingly, the result of the determination by the machine controller 60 at Step S30 in the control process depicted in FIG. 5 is NO, and, through Steps S100 and S10, the CB cut valve 31 is fully opened at Step S20. While the full operation is being continued, the machine controller 60 sequentially repeats Steps S30, S100, S10, and S20, thus the CB cut valve 31 is kept fully opened.

In addition, as depicted in the bottom diagram in FIG. 6, the pump flow rate of the hydraulic pump 22 (see FIG. 2) increases from the minimum pump flow rate at a time of an operation stop to a pump flow rate according to the full operation of the operation device 41 or 42. The pump flow rate is kept while the full operation is being continued.

Next, the behavior of each element of equipment during fine operation is explained by using FIG. 5 and FIG. 7. FIG. 7 is a figure depicting an example of the behavior over time of each element in the hydraulic system during fine operation in the work machine according to the first embodiment of the present invention.

The upper diagram in FIG. 7 depicts a state where "fine operation" of the operation device 41 or 42 (see FIG. 2) is continued for a certain period. The operation amount of the operation device 41 or 42, which is 0 at a time of an operation stop, is kept in the range larger than the first threshold Lt1 and less than the second threshold Lt2 at time tm1, and ends at a time point after time tm4. Where the operation amount of the operation device 41 or 42 is in the range larger than the first threshold Lt1 and less than the second threshold Lt2, the operation of the operation device 41 or 42 corresponds to fine operation on the hydraulic actuator 23 or 24.

At this time, the spool of the directional control valve 25 or 26 (see FIG. 2) moves according to the operation pilot pressure generated by the fine operation on the operation device 41 or 42. Thereby, as depicted in the middle diagram in FIG. 7, the bleed-off opening area decreases according to the movement amount of the spool. When the fine operation ends, accordingly the spool returns to the neutral position, and thereby the bleed-off opening area returns to the maximum value.

On the other hand, as depicted in the middle diagram in FIG. 7, the opening area of the CB cut valve 31 (see FIG. 2) is controlled by the machine controller 60 according to the elapsed time of the fine operation.

Specifically, in the period from time tm1 to time tm2, the CB cut valve 31 is kept fully opened similarly to that at a time of an operation stop. The period from time tm1 equivalent to the start time of the fine operation (a time at which the operation amount of the operation device 41 or 42 has reached the first threshold Lt1, that is, a time at which the operation pilot pressure sensed by the pressure sensor 53 or 54 is estimated as having reached the first threshold Pt1) to time tm2 is equivalent to the time threshold T0 at Steps S50 and S70 in the control process depicted in FIG. 5. The period is a period in which the hydraulic actuator 23 or 24 is supposed to be at an unstable drive state at a time of the start of movement. If the hydraulic fluid rapidly flows into the hydraulic actuator 23 or 24 in the period, an operator feels it as a shock by the start of movement of the hydraulic actuator 23 or 24, in some cases. In addition, there is a concern that stick-slip or the like caused by friction has a significant influence on the operability. In view of this, during the period, the CB cut valve 31 is kept fully opened, and a relatively large bleed-off flow rate is ensured. In the period, the bleed-off opening area on the center bypass line 29 is decided only by the bleed-off opening area of the first directional control valve 25 and the bleed-off opening area of the second directional control valve 26.

If the fine operation is continued also after time tm2, the opening area of the CB cut valve 31 decreases, and the CB cut valve 31 is switched from the fully-opened state to the fully-closed state in the end. Thereafter, during a period until time tm4 when the fine operation is ended, the CB cut valve 31 is kept fully closed. It is supposed that, after time tm2, the drive state of the hydraulic actuator 23 or 24 which is being subjected to the fine operation is a state where the negative influence on the operability at start-up is reduced. Accordingly, even if the opening of the CB cut valve 31 is restricted, the bleed-off flow rate can be reduced without impairing the operability of the hydraulic actuator 23 or 24. It should be noted that the opening area (bleed-off opening area) of the CB cut valve 31 gradually decreases during the period ΔTc from time tm2 to time tm3. This is for preventing a sense of discomfort such as a shock from occurring as a result of an occurrence of a rapid change in the bleed-off flow rate due to the decrease in the opening area of the CB cut valve 31.

This is achieved by the following control process by the machine controller 60. The machine controller 60 determines YES at Step S30 in the control process depicted in FIG. 5, determines YES at Step S70, and outputs, to the CB cut valve 31, a valve command for reducing the opening area of the CB cut valve 31 at Step S80. The machine controller 60 repeats Steps S30, S70, and S80 at control intervals again and again, and thereby executes control of reducing the opening area of the CB cut valve 31.

In this manner, from time tm2 to time tm4 in the period of the fine operation, the bleed-off opening area of the CB cut valve 31 decreases, thus the bleed-off flow rate decreases by a corresponding amount. Accordingly, in the period from time tm2 to time tm4, bleed-off loss decreases, thus it is possible to conserve energy as compared to the period from time tm1 to time tm2. In addition, at a time of switching of the CB cut valve 31 to the fully-closed state in the period ΔTc from time tm2 to time tm3, the opening of the CB cut valve 31 is gradually restricted, thus a rapid decrease in the bleed-off flow rate due to the restriction of the CB cut valve 31 is prevented. That is, when the bleed-off flow rate is reduced by the restriction of the CB cut valve 31, the operability of the hydraulic actuator 23 or 24 is not impaired.

It should be noted that if the bleed-off flow rate decreases due to full closing of the CB cut valve 31, this generates a flow from the hydraulic pump 22 into the hydraulic actuator 23 or 24 by a delivery flow rate corresponding to the decrease. In this case, even if the operation amount of the operation device 41 or 42 is the same, the drive velocity of the hydraulic actuator 23 or 24 increases. Accordingly, in order to keep the drive velocity of the hydraulic actuator 23 or 24 at the same velocity during the control of restricting the CB cut valve 31, an operator needs to change and adjust the operation amount of the operation device 41 or 42.

In view of this, as depicted in the lower diagram in FIG. 7, the pump flow rate of the hydraulic pump 22 (see FIG. 2) is controlled such that it decreases according to the reduction of the opening area of the CB cut valve 31. Specifically, in the period ΔTc from time tm2 to time tm3, the pump flow rate decreases from the flow rate according to the fine operation on the operation device 41 or 42 in conjunction with the reduction of the opening area of the CB cut valve 31. During the subsequent period until time tm4 at which the fine operation is ended, the pump flow rate is kept at a flow rate obtained by subtracting, from the flow rate according to the fine operation, the bleed-off flow rate Q (a value computed in accordance with the relational expression (1) described above) which has decreased due to full closing of the CB cut valve 31.

This is achieved by the following control process of the machine controller 60. The machine controller 60 determines YES at Step S30 in the control process depicted in FIG. 5, determines YES at Step S70, and outputs, to the regulator 22*a*, a pump control command for gradually reducing the pump capacity of the hydraulic pump 22 at Step S90. Note that the reduction amount of the pump capacity is a value computed on the basis of the correction capacity computed at Step S60. The machine controller 60 repeats Steps S30, S70 and S80 at control intervals again and again, and thereby executes control of reducing the pump capacity of the hydraulic pump 22.

In this manner, at a timing which is the same as the control of restricting the CB cut valve 31, the pump displacement of the hydraulic pump 22 is reduced by an amount corresponding to the decrease in the bleed-off flow rate caused by the restriction of the CB cut valve 31. Because of this, the velocity of the hydraulic actuator 23 or 24 can be kept at a substantially constant velocity without changing the operation amount of the operation device 41 or 42 during fine operation. That is, deterioration of the operability can be prevented when it is attempted to conserve energy in fine operation.

As mentioned above, the hydraulic excavator (work machine) according to the first embodiment of the present invention includes: the hydraulic pump 22 driven by the engine 21 (prime mover); the hydraulic actuators 23 and 24 driven by the hydraulic fluid supplied from the hydraulic pump 22; the center bypass line 29 having one side that is connected to the delivery side of the hydraulic pump 22, and also the other side that is connected to the hydraulic working fluid tank 28; the open-center directional control valves 25 and 26 that are arranged on the center bypass line 29, and control flows of the hydraulic fluid to be supplied from the hydraulic pump 22 to the hydraulic actuators 23 and 24; the CB cut valve 31 that is arranged on the center bypass line 29 and between the directional control valve 26 and the hydraulic working fluid tank 28; and the machine controller 60 (controller) that controls the opening of the CB cut valve 31. The machine controller 60 (controller) restricts the opening of the CB cut valve 31 if operation on the hydraulic actuator 23 or 24 is in the fine operation state in which the operation on the hydraulic actuator 23 or 24 is within the predetermined range representing the region of the fine operation, and the fine operation state is continued longer than the predetermined period (T0), and fully opens the CB cut valve 31 otherwise, that is, if operation on the hydraulic actuator 23 or 24 is in the fine operation state which the operation on the hydraulic actuator 23 or 24 is within the predetermined range representing the region of the fine operation, and a duration of the fine operation state is less than or equal to the predetermined period (T0).

According to this configuration, the restriction of the bleed-off flow rate by the CB cut valve 31 is not executed in the initial period of the fine operation on the hydraulic actuator 23 or 24, thus the operability of the hydraulic actuators 23 and 24 is not impaired. Additionally, the bleed-off flow rate is reduced by restricting the opening of the CB cut valve 31 after the elapse of the predetermined period of the fine operation, thus it is possible to conserve energy. That is, it is possible to pursue both energy conservation and the operability during fine operation on the hydraulic actuator 23 or 24.

In addition, the hydraulic excavator (work machine) according to the first embodiment includes the operation devices 41 and 42 for operating the hydraulic actuators 23 and 24. Furthermore, the machine controller 60 (controller) determines that the operation on the hydraulic actuator 23 or 24 is in the fine operation state in the case where the operation pilot pressure (operation amount) of the operation device 41 or 42 is greater than the predetermined first threshold Pt1 (Lt1), and is smaller than the predetermined second threshold Pt2 (Lt2). According to this configuration, it is possible to determine fine operation on the hydraulic actuator 23 or 24 based on the operation pilot pressures (operation amounts) of the operation devices 41 and 42 without installing additional sensors. That is, it is possible to avoid complexity of configuration related to control of the CB cut valve 31 during fine operation.

In addition, in the present embodiment, the machine controller 60 (controller) is configured to gradually restrict the opening of the CB cut valve 31 such that the CB cut valve 31 switches to the fully-closed state in a certain period ΔTc when restricting the opening. According to this configuration, when the control of restricting the CB cut valve 31 is executed, it is possible to prevent a rapid decrease in the bleed-off flow rate, and to reduce deterioration of the operability of the hydraulic actuators 23 and 24.

In addition, in the present embodiment, the hydraulic pump 22 is configured to have a variable pump displacement, and the machine controller 60 (controller) is configured to reduce the pump displacement of the hydraulic pump 22 in conjunction with restriction of the opening of the CB cut valve 31. According to this configuration, when the bleed-off flow rate decreases due to control of restricting the CB cut valve 31, it is possible to keep the velocities of the hydraulic actuators 23 and 24 at substantially constant velocities without changing operation amounts of the operation devices 41 and 42. That is, it is possible to maintain favorable operability even when it is attempted to conserve energy during fine operation.

[Modification Example of First Embodiment]

Figure 8:
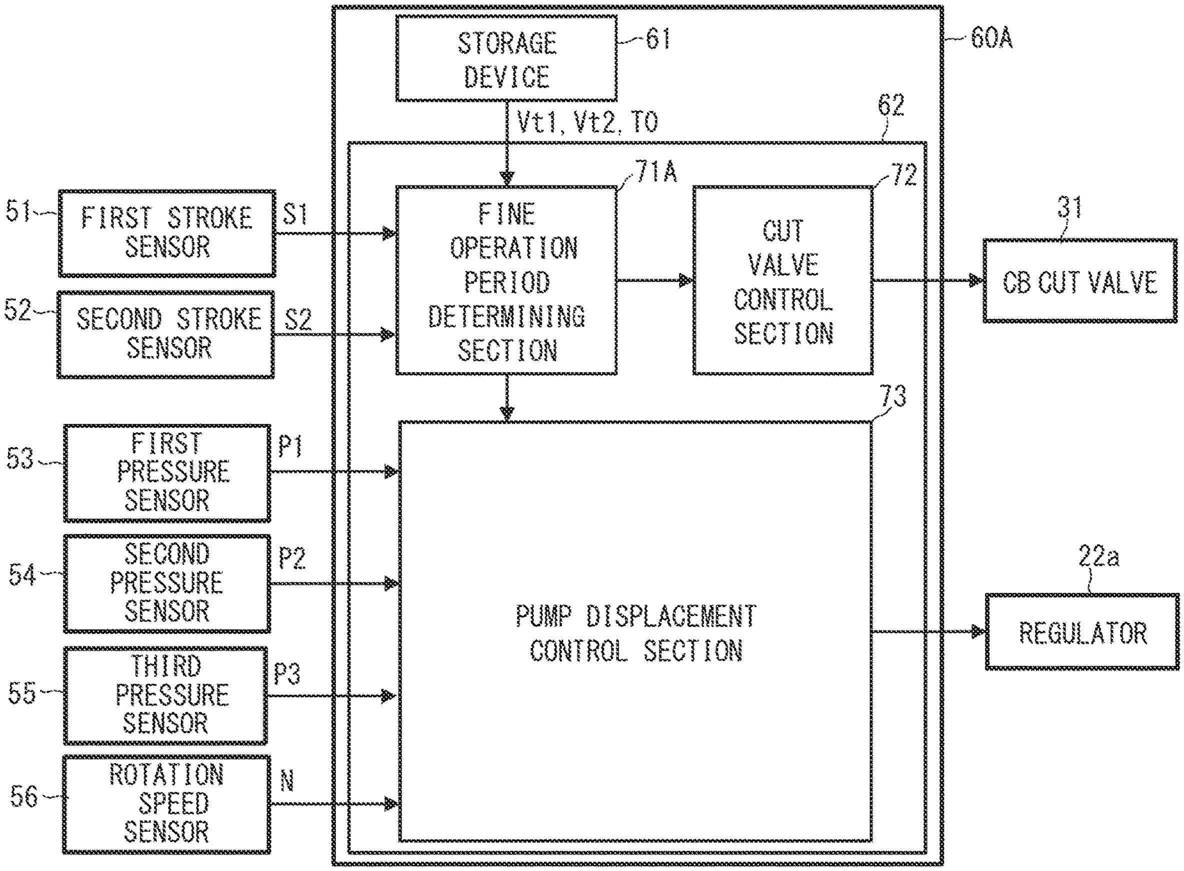
FIG. 8 is a block diagram depicting the functional configuration of a controller included as part of a work machine according to a modification example of the first embodiment of the present invention.
Figure 9:
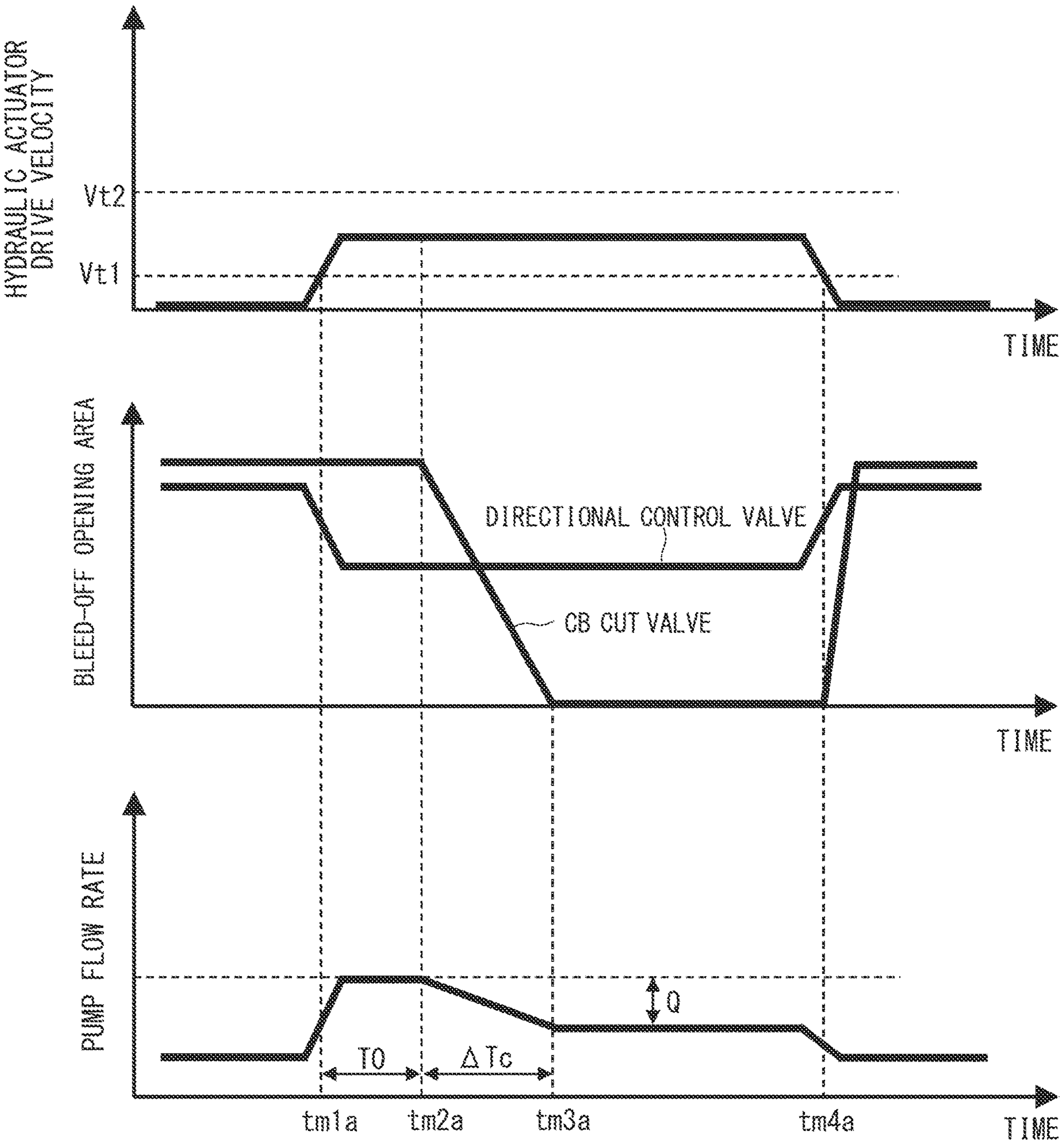
FIG. 9 is a figure depicting an example of the behavior over time of each element in the hydraulic system during fine operation in the work machine according to the modification example of the first embodiment of the present invention.

Next, a work machine according to a modification example of the first embodiment of the present invention is explained by using FIG. 5, FIG. 8, and FIG. 9. FIG. 8 is a block diagram depicting the functional configuration of a controller included as part of the work machine according to the modification example of the first embodiment of the present invention. FIG. 9 is a figure depicting an example of the behavior over time of each element in the hydraulic system during fine operation in the work machine according to the modification example of the first embodiment of the present invention. Note that in FIG. 8 and FIG. 9, since those with reference characters which are the same reference characters as those depicted in FIG. 1 to FIG. 7 are similar portions, detailed explanations thereof are omitted.

The work machine according to the modification example of the first embodiment of the present invention is different from the first embodiment in terms of a determination method performed by a fine operation period determining section 71A of a machine controller 60A depicted in FIG. 8. In other respects, the configuration is similar to the configuration in the case of the first embodiment.

As a method of determining whether or not operation on the hydraulic actuator 23 or 24 is in the fine operation state, the fine operation period determining section 71A according to the modification example makes the determination depending on whether or not the drive velocity of the first hydraulic actuator 23 or the second hydraulic actuator 24 is within a predetermined velocity range representing a region of the fine operation. Specifically, for example, the fine operation period determining section 71A determines whether or not the drive velocity of the first hydraulic actuator 23 or the second hydraulic actuator 24 obtained on the basis of a stroke S1 of the first hydraulic actuator 23 or a stroke S2 of the second hydraulic actuator 24 sensed by the first stroke sensor 51 or the second stroke sensor 52 is within the predetermined velocity range representing the region of the fine operation. The fine operation period determining section 71A can take in the strokes S1 and S2 sensed by the stroke sensors 51 and 52 at control intervals, and obtain temporal change amounts of the strokes, that is, the drive velocities of the actuators, from the strokes between the previous control intervals. The determination is made by using a temporal change amount (drive velocity) of a stroke with a relatively larger sensing value in the temporal change amounts (drive velocities) of the strokes S1 and S2 sensed by the first stroke sensor 51 and the second stroke sensor 52. For example, the predetermined velocity range representing the fine operation region is a range larger than a preset first threshold Vt1 and less than a preset second threshold Vt2 (Vt2>Vt1). The first threshold Vt1 and the second threshold Vt2 are stored in the storage device 61 in advance, and are 10 [mm/s] and 100 [mm/s], respectively, for example. The first threshold Vt1 is a value that is set for excluding the stationary states of the hydraulic actuators 23 and 24. The second threshold Vt2 is a drive velocity of the hydraulic actuators 23 and 24 defining the upper limit of the fine operation region. In the present modification example, the first stroke sensor 51 and the second stroke sensor 52 function as sensors that sense information on the drive velocities of the first hydraulic actuator 23 and the second hydraulic actuator 24, respectively.

A procedure of controlling the CB cut valve 31 and the hydraulic pump 22 by the machine controller 60A having such functional configuration is different from the control procedure by the machine controller 60 according to the first embodiment in terms of the process at Step S30 in the control process depicted in FIG. 5. The processes at the other steps are similar to those in the case of the first embodiment.

At Step S30 depicted in FIG. 5, it is determined whether or not operation on the hydraulic actuator 23 or 24 is in a fine operation state. In the first embodiment, as one method of the determination used, it is determined whether or not operation (operation amount) of the operation device 41 or 42 is within the predetermined range representing the fine operation region. Specifically, the fine operation period determining section 71 determines whether or not the operation pilot pressure P1 or P2 of the operation device 41 or 42 sensed by the pressure sensor 53 or 54 is within the range larger than the first threshold Pt1 and less than the second threshold Pt2. In contrast, in the present modification example, as another method of the determination used, it is determined whether or not the drive velocity of the first hydraulic actuator 23 or the second hydraulic actuator 24 is within the predetermined velocity range representing the fine operation region. Specifically, the fine operation period determining section 71A determines whether or not the temporal change amount (drive velocity) of the stroke S1 or S2 of the first hydraulic actuator 23 or the second hydraulic actuator 24 sensed by the first stroke sensor 51 or the second stroke sensor 52 is within the range larger than the first threshold Vt1 and less than the second threshold Vt2. Note that the determination is made by using a temporal change amount (drive velocity) of a stroke with a relatively larger value in the temporal change amounts (drive velocities) of the strokes S1 and S2 of the first hydraulic actuator 23 and the second hydraulic actuator 24 sensed by the first stroke sensor 51 and the second stroke sensor 52.

The behavior of the CB cut valve 31 and the hydraulic pump 22 according to the present modification example during fine operation is different from that of the first embodiment in the following respect. The timing of the start of the control of restricting the opening (opening area) of the CB cut valve 31 is not time tm2 (see the upper diagram and middle diagram in FIG. 7) after the elapse of the predetermined period (time threshold T0) from time tm1 at which the operation amount of the operation device 41 or 42 (see FIG. 2) has reached the first threshold Lt1, but is changed to time tm2a after the elapse of the predetermined period (time threshold T0) from time tmla at which the drive velocity of the hydraulic actuator 23 or 24 has reached the first threshold Vt1 as depicted in FIG. 9. The timing of the start of the control of reducing the pump flow rate of the hydraulic pump 22 also is changed to time tm2a according to the change in the timing of the start of the control of restricting the CB cut valve 31. In addition, the timing of the end of the closing of the CB cut valve 31 is not time tm4 (see the upper diagram and middle diagram in FIG. 7) at which the operation amount of the operation device 41 or 42 has decreased to the first threshold Lt1, but is changed to time tm4a at which the drive velocity of the hydraulic actuator 23 or 24 has decreased to the first threshold Vt1 as depicted in FIG. 9.

Similarly to the first embodiment mentioned before, according to the modification example of the first embodiment mentioned above, the restriction of the bleed-off flow rate by the CB cut valve 31 is not executed in the initial period of the fine operation on the hydraulic actuator 23 or 24, thus the operability of the hydraulic actuators 23 and 24 is not impaired. Additionally, the bleed-off flow rate is reduced by restricting the opening of the CB cut valve 31 after the elapse of the predetermined period of the fine operation, thus it is possible to conserve energy. That is, it is possible to pursue both energy conservation and the operability during fine operation on the hydraulic actuator 23 or 24.

In addition, the hydraulic excavator (work machine) according to the modification example of the first embodiment further includes the stroke sensors 51 and 52 (sensors) that sense the strokes (information on drive velocities) of the hydraulic actuators 23 and 24. Furthermore, the machine controller 60A (controller) determines that operation on the hydraulic actuator 23 or 24 is in the fine operation state in the case where the temporal change amount of the stroke (drive velocity) of the hydraulic actuator 23 or 24 obtained on the basis of the strokes (information) sensed by the stroke sensors 51 and 52 (sensors) is greater than the predetermined first threshold Vt1 and smaller than the predetermined second threshold Vt2. According to this configuration, it is determined whether the operation on the hydraulic actuator 23 or 24 is in the fine operation state based on the actual drive velocities of the hydraulic actuators 23 and 24, thus the timing of the start of movement at which the hydraulic actuator 23 or 24 is in an unstable drive state can be captured surely.

Second Embodiment

Figure 10:
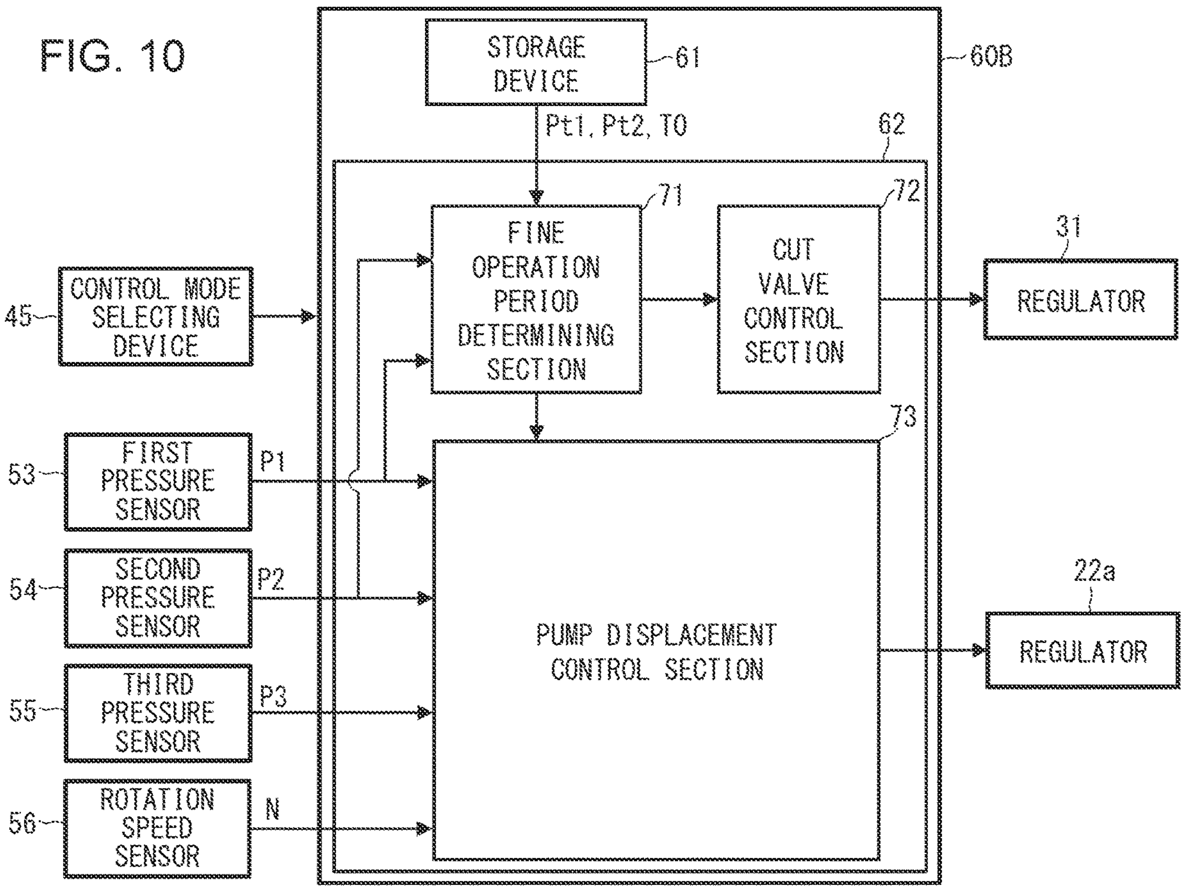
FIG. 10 is a block diagram depicting the functional configuration of a controller included as part of a work machine according to a second embodiment of the present invention.

Next, a work machine according to a second embodiment of the present invention is explained by using FIG. 10. FIG. 10 is a block diagram depicting the functional configuration of a controller included as part of the work machine according to the second embodiment of the present invention. Note that in FIG. 10, since those with reference characters which are the same reference characters as those depicted in FIG. 1 to FIG. 9 are similar portions, detailed explanations thereof are omitted.

As depicted in FIG. 10, the work machine according to the second embodiment of the present invention is different from the first embodiment in that the hydraulic excavator further includes a control mode selecting device 45, and a machine controller 60B disables execution of the control described above on the CB cut valve 31 and the hydraulic pump 22 based on an output (instruction signal) of the control mode selecting device 45, in some cases. In other respects, the configuration is similar to the configuration in the case of the first embodiment.

Specifically, according to operation by an operator, the control mode selecting device 45 selects either one of a first control mode of enabling the control to restrict the opening of the CB cut valve 31 and the control to reduce the pump capacity of the hydraulic pump 22 by the machine controller 60 of the first embodiment and a second control mode of disabling execution of the first control mode. For example, the control mode selecting device 45 is installed in the cab 15, and can include a switch for selecting either one of the first control mode and the second control mode. The control mode selecting device 45 can also include a touch panel that makes it possible to select the first control mode or the second control mode via an interface on a display screen. The control mode selecting device 45 is electrically connected to the machine controller 60B, and outputs, to the machine controller 60B, an instruction signal for giving an instruction for execution of either one control mode of the first control mode and the second control mode selected by operation by an operator.

As mentioned before, the first control mode is for the purpose of pursuing both energy conservation and the operability during fine operation. On the other hand, the second control mode places the highest emphasis on the operability during fine operation. The bleed-off flow rate is reduced by restriction of the CB cut valve 31 during fine operation in the first control mode, thus there is a concern over influence on the operability although the influence can be so insignificant. In addition, depending on the content of work, cases where the operability is more important than enhancement of energy conservation can be expected. In such cases, execution of the first control mode is disabled by selecting the second control mode according to operation by an operator.

The machine controller 60B according to the second embodiment is configured to execute a selected control mode in the first control mode and the second control mode on the basis of an instruction signal from the control mode selecting device 45. Control performed in the first control mode is the same as the control of the opening of the CB cut valve 31 and the control of the pump displacement of the hydraulic pump 22 executed by the machine controller 60 according to the first embodiment mentioned before. On the other hand, the second control mode is for disabling execution of the first control mode, and always keeping the CB cut valve 31 fully opened. That is, even if fine operation on the hydraulic actuator 23 or 24 is continued longer than a predetermined period during execution of the second control mode, control of restricting the CB cut valve 31 is not executed.

According to the second embodiment mentioned above, where the machine controller 60B executes the first control mode, it is possible to pursue both energy conservation and the operability during fine operation on the hydraulic actuator 23 or 24, similarly to the first embodiment mentioned before.

In addition, the hydraulic excavator according to the present embodiment further includes the control mode selecting device 45 that selects either one of the first control mode and the second control mode according to operation by an operator. Furthermore, the machine controller 60B (controller) is configured to execute either one of the first control mode of enabling control to restrict the opening of the CB cut valve 31 and the second control mode of disabling execution of the first control mode and keeping the CB cut valve 31 fully opened, on the basis of a selection by the control mode selecting device 45. According to this configuration, by an operator selecting a control mode according to situations, it becomes possible to choose to attempt to pursue both energy conservation and the operability or to place emphasis on the operability.

Other Embodiments

Note that the present invention is not limited to the present embodiments, and includes various modification examples. The embodiments described above are explained in detail for explaining the present invention in an easy-to-understand manner, and the present invention is not necessarily limited to those including all configurations explained. It is possible to replace some of configurations of an embodiment with configurations of another embodiment, and it is also possible to add configurations of an embodiment to the configurations of another embodiment. In addition, some of configurations of each embodiment can also have other configurations additionally, be deleted or be replaced.

For example, whereas the present invention is applied to a hydraulic excavator in the examples depicted in the embodiments mentioned above, the present invention can be applied widely to various types of work machine such as a hydraulic crane or a wheel loader including open-center directional control valves.

In addition, the first operation device 41 and the second operation device 42 are configured as hydraulic operation devices in the examples depicted in the embodiments mentioned above. However, the first operation device and the second operation device may also be configured as electric operation devices. Electric operation devices sense operation directions and operation amounts by using potentiometers or the like, and output electric signals according to sensing values to the machine controllers 60, 60A, and 60B. That is, the operation devices function as operation amount sensors that sense the operation amounts of the operation devices. In this case, the machine controllers 60 and 60B according to the first and second embodiments are configured to determine whether or not operation on the hydraulic actuator 23 or 24 is in the fine operation state based on the operation amounts sensed by the operation devices, instead of operation pilot pressures sensed by the pressure sensors 53 and 54. That is, the determination is made whether the operation amounts of the operation devices sensed by the operation devices are within the range larger than the first threshold Lt1 and less than the second threshold Lt2.

In addition, in the modification example of the first embodiment mentioned above, the machine controller 60A is configured to determine whether operation on the hydraulic actuator 23 or 24 is in the fine operation state based on temporal change amounts (the drive velocities of the hydraulic actuators 23 and 24) of the strokes obtained on the basis of the strokes S1 and S2 sensed by the stroke sensors 51 and 52 in the example. However, it is also possible to compute the drive velocities of hydraulic actuators such as the boom cylinder 9, the arm cylinder 10, the bucket cylinder 11, and the like to drive the boom 6, the arm 7, and the bucket 8 included in the front work implement 1 on the basis of postural information on the front work implement 1 sensed by angle sensors attached to the boom 6, the arm 7, and the bucket 8, instead of stroke sensors. That is, the machine controller may compute the drive velocities of the hydraulic actuators based on the postural information on the front work implement 1 sensed by the angle sensors, and determine whether or not operation on the hydraulic actuator 23 or 24 is in the fine operation state based on the drive velocities.

In addition, for simplification of the explanations, the number of directional control valves connected in tandem on the center bypass line 29 is two in the cases explained in the embodiments mentioned above. In this case, a determination whether operation on the hydraulic actuator 23 or 24 is fine operation is made by using a relatively larger value in sensing values sensed by the two pressure sensors 53 and 54 or stroke sensors 51 and 52. In addition, the combined opening area As of the bleed-off opening area is computed in accordance with the relational expression (2) described above. In contrast, where the number of directional control valves connected in tandem on the center bypass line 29 is three or greater, the determination about fine operation is made by using the maximum value in a plurality of sensing values sensed by a plurality of sensors. In addition, the combined opening area As of the bleed-off opening area can be determined by adding each member corresponding to a bleed-off opening area Abn of each directional control valve such that the expression becomes similar to the relational expression (2).

DESCRIPTION OF REFERENCE CHARACTERS

21: Engine (prime mover)
22: Hydraulic pump
23: First hydraulic actuator (hydraulic actuator)
24: Second hydraulic actuator (hydraulic actuator)
25: First directional control valve (directional control valve)
26: Second directional control valve (directional control valve)
28: Hydraulic working fluid tank
29: Center bypass line
31: Center bypass cut valve
41: First operation device (operation device)
42: Second operation device (operation device)
45: Control mode selecting device
51: First stroke sensor (sensor)
52: Second stroke sensor (sensor)
60, 60A, 60B: Machine controller (controller)

The invention claimed is:

1. A work machine comprising:

a hydraulic pump driven by a prime mover;

a hydraulic actuator driven by a hydraulic fluid supplied from the hydraulic pump;

a center bypass line having one side that is connected to a delivery side of the hydraulic pump, and another side that is connected to a hydraulic working fluid tank;

an open-center directional control valve that is arranged on the center bypass line, and controls a flow of the hydraulic fluid to be supplied from the hydraulic pump to the hydraulic actuator;

a center bypass cut valve that is arranged on the center bypass line and between the directional control valve and the hydraulic working fluid tank; and a controller that controls an opening of the center bypass cut valve, wherein the controller is configured to restrict the opening of the center bypass cut valve if operation on the hydraulic actuator is in a fine operation state in which the operation on the hydraulic actuator is within a predetermined range representing a region of fine operation, and the fine operation state is continued longer than a predetermined period, and fully open the center bypass cut valve if operation on the hydraulic actuator is the fine operation state in which the operation on the hydraulic actuator is within the predetermined range representing the region of the fine operation, and a duration of the fine operation state is less than or equal to the predetermined period.

2. The work machine according to claim 1, further comprising:
an operation device for operating the hydraulic actuator, wherein
the controller is configured to determine that the operation on the hydraulic actuator is in the fine operation state in a case where an operation amount of the operation device is greater than a predetermined first threshold, and is smaller than a predetermined second threshold.

3. The work machine according to claim 1, further comprising:
a sensor that senses information on a drive velocity of the hydraulic actuator, wherein
the controller is configured to determine that the operation on the hydraulic actuator is in the fine operation state in a case where a drive velocity of the hydraulic actuator obtained on a basis of the information sensed by the sensor is greater than a predetermined first threshold, and is smaller than a predetermined second threshold.

4. The work machine according to claim 1, wherein
the controller is configured to gradually restrict the opening of the center bypass cut valve such that the center bypass cut valve switches to a fully-closed state in a certain period when restricting the opening.

5. The work machine according to claim 1, wherein
the hydraulic pump is configured to have a variable pump displacement, and
the controller is configured to reduce the pump displacement of the hydraulic pump in conjunction with restriction of the opening of the center bypass cut valve.

6. The work machine according to claim 1, further comprising:
a control mode selecting device that selects either one of a first control mode and a second control mode according to operation by an operator, wherein
the controller is configured to execute either one of the first control mode of enabling control to restrict the opening of the center bypass cut valve, and the second control mode of disabling execution of the first control mode and keeping the center bypass cut valve fully opened, on a basis of a selection by the control mode selecting device.

* * * * *